US012775129B2

(12) United States Patent
Di Trapani

(10) Patent No.: US 12,775,129 B2
(45) Date of Patent: Oct. 27, 2026

(54) OPTICAL FILTER AND LIGHTING DEVICE TO REPRODUCE THE LIGHT OF THE SKY AND THE SUN COMPRISING THE SAME

(71) Applicant: CoeLux S.r.l., Lomazzo (IT)

(72) Inventor: Paolo Di Trapani, Cavallasca (IT)

(73) Assignee: CoeLux S.r.l., Lomazzo (IT)

( * ) Notice: Subject to any disclaimer, the term of this patent is extended or adjusted under 35 U.S.C. 154(b) by 448 days.

(21) Appl. No.: 18/259,604

(22) PCT Filed: Dec. 23, 2021

(86) PCT No.: PCT/IB2021/062254

§ 371 (c)(1),
(2) Date: Jun. 28, 2023

(87) PCT Pub. No.: WO2022/144720

PCT Pub. Date: Jul. 7, 2022

(65) Prior Publication Data

US 2024/0069260 A1 Feb. 29, 2024

(30) Foreign Application Priority Data

Jan. 4, 2021 (IT) ........................ 102021000000074
Jan. 4, 2021 (IT) ........................ 102021000000077

(51) Int. Cl.
*G02B 5/22* (2006.01)
*F21V 8/00* (2006.01)
*G02B 5/00* (2006.01)

(52) U.S. Cl.
CPC ............... *G02B 5/22* (2013.01); *G02B 5/003* (2013.01); *G02B 6/008* (2013.01); *G02B 2207/101* (2013.01)

(58) Field of Classification Search
CPC .......... G02B 6/08; G02B 6/04; G02B 6/0005; G02B 6/0051; G02B 6/02052;
(Continued)

(56) References Cited

U.S. PATENT DOCUMENTS 4,761,062 A 8/1988 Loce et al.
2012/0321249 A1* 12/2012 DeMeritt ................ G02B 6/32 385/33

FOREIGN PATENT DOCUMENTS

WO 2009156348 A1 12/2009
WO 2014075721 A1 5/2014
(Continued)

OTHER PUBLICATIONS

Markus Zwerger, European International Searching Authority, International Search Report and Written Opinion, counterpart PCT Application No. PCT/IB2021/062254, mailed May 2, 2022, 15 total pages.

*Primary Examiner* — Angela M. Medich
(74) *Attorney, Agent, or Firm* — DiBerardino McGovern IP Group LLC

(57) ABSTRACT

The present invention relates to an optical filter (100) comprising a substantially flat entry surface (101), a substantially flat exit surface (102) parallel to the entry surface, a plurality of channels (103) made of a material substantially transparent to light, wherein the channels (103) of the plurality of channels comprise an entry face (104), an exit face (105) and a lateral surface extending perimetrically between the entry face (104) and the exit face (105) over a length (L) of the channels (103), are arranged side by side and parallel to each other so as to define a plurality of interspaces between adjacent channels (103), have a channel axis (Y) incident to the entry (101) and exit (102) surface, and are arranged with the entry face (104) substantially overlapping the entry surface (101) and with the exit face (105) substantially overlapping the exit surface (102), at least one element of optically absorbing and/or non-transparent material (108, 109; 109') configured and arranged with respect to the channels (103) so as to reduce and/or
(Continued)

substantially prevent the passage of light between adjacent channels (103) of the plurality of channels and so as to reduce the passage of light parallel to the channels and externally thereto, or at least a first element of optically absorbing material (108) configured and arranged with respect to the channels (103) so as to reduce and/or substantially prevent the passage of light between adjacent channels (103) of the plurality of channels (103) and at least a second element of optically non-transparent material (109; 109') configured and arranged with respect to channels (103) so as to reduce and/or substantially prevent the passage of light parallel to the channels (103) and externally thereto through interspaces between adjacent channels (103); wherein the channels (103) have a refractive index whose value decreases starting from a maximum refractive index (na) along a radially outward direction away from the channel axis (Y) passing through a centre of gravity of a section of the respective channel (103), so as to define a radial profile of refractive index of the channels, and wherein the radial profile of refractive index of the channels (103) is configured such that the light rays crossing any channel (103) of the plurality of channels and belonging to a beam of rays emerging from any point on an edge of an entry face (104) of the channel exit the exit face (105) of the channel with substantially parallel directions.

25 Claims, 11 Drawing Sheets

(58) Field of Classification Search
CPC ................ G02B 6/023; G02B 6/02314; G02B 6/02333; G02B 6/028; G02B 6/0281; G02B 6/0283; G02B 6/0285; G02B 3/0087; G02B 5/22; G02B 5/003
See application file for complete search history.

(56) References Cited

FOREIGN PATENT DOCUMENTS

| | | | |
|---|---|---|---|
| WO | 2020201938 | A1 | 10/2020 |
| WO | 2020201939 | A1 | 10/2020 |
| WO | 2022144720 | A1 | 7/2022 |

* cited by examiner

OPTICAL FILTER AND LIGHTING DEVICE TO REPRODUCE THE LIGHT OF THE SKY AND THE SUN COMPRISING THE SAME

TECHNICAL FIELD

The present invention relates in general terms to a new optical filter, and in particular to an optical filter configured to transform an incident light into a filtered light having an angular luminance profile characterized by a first substantially constant value for emission directions comprised within an angular acceptance cone and a second substantially zero value for emission directions outside the angular acceptance cone. Such an optical filter is particularly suitable for use in a device that allows the artificial reproduction of a light capable of recreating, indoors, the experience of natural light of the sky and the sun on a clear day. The present invention also relates to a lighting device simulating the natural light of the sky and the sun using such an optical filter as well as a process for producing the optical filter.

BACKGROUND

It clearly follows from the Applicant's international patent application No. WO 2020/201938 as well as from further experience gained by the Applicant that the main characteristics of natural light on a clear day that distinguish it from the artificial light of the lamps are connected to its ability to:

(i) produce sharp shadows, thanks to the highly directional characteristic of sunlight, which has a divergence of only 0.5 degrees, (ii) produce blue shadows, as these are illuminated by sky light whose correlated colour temperature—CCT—is much higher than the correlated colour temperature of sunlight, (iii) produce bright shadows, i.e. with a luminance typically not less than 15-20% of the characteristic luminance of the surfaces exposed both the light of the sky and to the light of the sun, (iv) produce an image of the sky and the sun perceived by the eye of the observer at an infinite distance, and (v) produce the image of a clear, cloudless sky and of a round sun in sharp contrast to the sky.

The industrial development of a device capable of producing a natural light identical to natural light according to all five of the above characteristics has never been achieved to date. Furthermore, the intrinsic complexity of achieving such an objective would imply costs that would make it difficult to market any resulting product.

In particular, in order to produce an image of the sun at an infinite distance (characteristic iv) in the eye, it is necessary that the luminance profile of the light is spatially uniform across the observation surface. This is in fact the condition whereby the two eyes, in order to see the same image, must be aligned in a parallel manner, giving the brain the information of an object at substantially infinite distance. Furthermore, in order to ensure the image of a round sun in sharp contrast to a cloudless sky (characteristic v) it is necessary that the angular luminance profile from the sunlight has a constant value up to a maximum angle, and be substantially zero elsewhere. In fact, the eye associates a standard bell-shaped angular luminance profile (e.g. Gaussian) of a sun that gradually "fades" into the sky, with the presence of clouds or haze in the sky. As the Applicant has been able to verify directly, this feature is unwelcome to the market, as it compromises the device's ability to evoke the experience of a day with clear sky.

An optical filter theoretically capable of producing a spatially uniform luminance over a given surface, and at the same time of producing an angular profile of constant luminance within an angular acceptance cone, is the micro-optical tandem mixer, hereinafter more simply "tandem mixer" considered by the Applicant in the device described in WO 2020/201938. Such an optical filter consists of two matrices with identical lenses (or micro-lenses), the one facing the other, and arranged at a distance equal to the common focal length. This optical filter produces the uniformly illuminated image of the lens opening in the far field, and therefore also on the retina in the case of infinity vision. This is provided that the lenses of the entry matrix are in turn uniformly illuminated, which is not difficult to achieve in the case of small lenses.

However, the tandem mixer used in WO 2020/201938 has some significant problems in practice. First of all, it reproduces in the far field, in addition to the main image, also one or more secondary or ghost images, with the same shape as the main image, which are also uniformly illuminated, although typically with lower illuminance than the one relative to the main image. This circumstance occurs when the light entering the channels formed by the pairs of facing lenses also comes from directions outside the acceptance cone of the filter, delimited by the bundle of straight lines passing through the centre of the entry lens and the edge of the exit lens. Typically this happens, for example, when the light to be mixed comprises, in addition to a main component having characteristics of high and controlled directionality, also a secondary or spurious component, also called "stray light", for example associated with the presence of imperfections in the optical system that produce uncontrolled phenomena of diffusion and/or multiple reflection of the light, as often happens in the case of the use of Fresnel optics. Or, it occurs when the entering light comprises tails in the angular profile, as is frequently the case with a regular angular profile of the Gaussian type. In such circumstances, the undesired phenomenon that occurs is due to the interaction or "cross talk" between adjacent channels, as they are not optically independent of each other. Specifically, the light entering through an entry lens of one channel, coming from directions outside the acceptance cone, exits through the exit lens of a different channel, producing a ghost image laterally to the main image, associated with a second luminance profile that is identical to the first except for the fact that it manifests itself at a different exit angle.

A second problem of the tandem mixer used in the device described in WO 2020/201938 is given by the fact that, in order to ensure maximum simplicity of construction and maximum brightness, the lens matrices composing it are made up of square, rectangular or hexagonal lenses, or in any case with a shape that allows maximum compaction and therefore maximum coverage of the entry and exit surfaces. Consequently, the image they produce in the far field is not circular but square, or rectangular, or hexagonal etc. In summary, a device that simply used a tandem mixer as described in WO 2020/201938 would produce in the sky the main image of a square (or rectangular, or hexagonal) sun surrounded by ghost images that are identical to the main one except for the fact of being less intense.

In order to eliminate the problem of secondary images, it was considered in WO 2020/201938 to introduce, downstream of the tandem mixer, a spatial filter obtained by means of a matrix of parallel absorbing channels, e.g. organised according to a honeycomb structure. This spatial filter, however, has the defect of introducing a regular pattern in the luminance profile that is easily perceivable by the observer, and for the removal thereof the Applicant has proposed the introduction of a further filter, i.e. a low-angle diffuser filter, downstream of it. Significantly, such a low-angle diffuser also has the purpose of mitigating the second mentioned problem of the tandem mixer, in that it allows the image of an object positioned beyond it to be blurred, the further away the object is, thus turning the images of squares, rectangles, hexagons etc. into circles.

In this way, a sun in sharp contrast to the sky was dispensed with. In fact, both the spatial filter with absorbing channels, due to the geometric cut it imposes on the light propagating at higher angles, and the low-angle diffuser filter, independently and therefore co-operatively, transform an angular profile of constant luminance, like the one produced by the tandem mixer, into a bell-shaped profile. In practice, the result produced by the device described in WO 2020/201938 is to produce an image of a strongly blurred sun, with contours that gradually fade into the sky, as happens in nature in the presence of haze or thin clouds in the upper atmosphere.

SUMMARY OF THE INVENTION

Aim of the present invention is therefore to devise an optical filter capable of ensuring, on an emission plane, the generation of a light having an angular distribution with a characteristic shape recalling the angular distribution of sunlight, i.e., an angular distribution characterized by a substantially constant value of the luminance for directions within a certain angular acceptance cone, i.e., the cone subtended by the image of the artificial sun to be reproduced, and substantially zero elsewhere. Such an angular distribution of the exiting light must be generated by the optical filter independently of the angular distribution of the entering light, i.e. both in the presence of stray light—be it characterized by the presence of a background for all directions, or by an angular luminance profile with peaks, even intense ones, for directions outside or very outside the cone subtended by the image of the sun—and in the presence of important tails in the angular profile at angles close to the opening angle of the angular acceptance cone, thus eliminating the undesired effect caused by optical components of standard use in the lighting sector.

In the context of the present description and in the subsequent claims, "substantially constant value of the luminance for directions comprised within a certain angular acceptance cone" means a luminance value that is maintained above 70%, preferably above 80%, more preferably above 90% of the peak value for substantially all directions comprised within a test cone having an angular opening equal to 50% of the angular opening of the angular acceptance cone, wherein the angular opening of the cone means the flat angle at the vertex of this cone. By way of example, the luminance measurement can be carried out by means of a luminance camera aligned with the direction with which the light is emitted by the filter (emission direction), by sampling uniformly the emission plane, e.g. by taking measurements at the nodes of a regular grid having a pitch equal to 3 cm.

A further aim of the present invention is to devise an optical filter which, when used in a lighting device simulating the natural light of the sky and the sun, is capable of generating an infinity image of a circular sun with well-defined contours.

Another aim is to devise an optical filter which, when used in a lighting device simulating the natural light of the sky and the sun, makes it superfluous to use both spatial filters with absorbing channels and low-angle diffuser filters, allowing the sharp contrast between the image of the sun and of the sky to be preserved.

It is not the least aim of the present invention to realize a lighting device simulating the natural light of the sky and the sun and is capable of providing an infinity image of a circular sun with well-defined contours.

These and other purposes of the present invention are achieved by means of an optical filter for lighting devices simulating the natural light of the sky and the sun, incorporating the features of the appended claims, which form an integral part of the present description.

In accordance with a first aspect thereof, the invention thus relates to an optical filter comprising a substantially flat entry surface, a substantially flat exit surface parallel to the entry surface, a plurality of channels made of a substantially light-transparent material, at least one element of optically absorbing and/or non-transparent material configured and arranged with respect to the channels so as to reduce and/or substantially prevent the passage of light between adjacent channels of the plurality of channels, and so as to reduce and/or substantially prevent the passage of light parallel to the channels and externally thereto, or, alternatively, at least a first element of optically absorbing material configured and arranged with respect to the channels so as to reduce and/or substantially prevent the passage of light between adjacent channels of the plurality of channels, and at least a second element of optically non-transparent material configured and arranged with respect to the channels so as to reduce and/or substantially prevent the passage of light parallel to the channels and externally thereto through the interspaces between adjacent channels.

The channels of the plurality of channels comprise an entry face, an exit face and a lateral surface extending perimetrically between the entry face and the exit face over a length of the channels, are arranged side by side and parallel to each other so as to define a plurality of interspaces between adjacent channels, have a channel axis incident to the entry and exit surfaces, and are arranged with the entry face substantially overlapping the entry surface and with the exit face substantially overlapping the exit surface.

The channels have a refractive index whose value decreases starting from a maximum refractive index along a radially outward direction away from the channel axis passing through a centre of gravity of a section of the respective channel, so that a radial profile of refractive index of the channels is defined. Furthermore, the radial profile of refractive index of the channels is configured such that the light rays crossing any channel of the plurality of channels and belonging to a beam of rays emerging from any point on an edge of an entry face of the channel exit the channel with substantially parallel directions.

In a completely equivalent and alternative way, the radial profile of refractive index of the channels is configured such that the light rays crossing any channel of the plurality of channels and belonging to a beam of rays emerging from any point of an entry face of the channel exit the channel with substantially parallel directions.

In a still completely equivalent and alternative manner, the radial profile of refractive index of the channels is configured such that the optical filter has an object plane and an image plane, at least one between the object plane and the image plane being placed at a distance from the entry surface and/or from the exit surface measured along the direction of the channel axis, wherein the distance is comprised between 0.5 $D_1$ and 2 $D_1$, with $D_1$ being a nominal distance given by a relation comprised in the group consisting of:

$$D_1 \simeq \frac{2L}{n_a \pi}$$

$$D_1 \simeq \frac{2.41L}{n_a} a$$

$$D_1 \simeq \frac{4L}{n_a \pi}.$$

Still equivalently and alternatively, the radial profile of refractive index of the channels is configured such that each channel of the plurality of channels behaves substantially as a converging lens having an optical axis coincident with a channel axis and a focal length f in the medium satisfying the relation 0.5 f'<f<2f', preferably 0.7 f'<f<1.6f', more preferably 0.7 f'<f<1.4f', even more preferably 0.9 f'<f<1.2f', with f'≃L or f'≃2L.

In a variant of the invention, the focal length f in the medium is substantially equal to f' (f=f'), with f'≃L or f'≃2L.

In the context of the present description and in the subsequent claims, the conditions that the radial profile of refractive index of the channels must satisfy, i.e., for example, the conditions of parallelism of the rays exiting the channels or the conditions inherent in the distances of the object and image planes or the conditions inherent in the focal length, are understood to be verified with reference to the optical filter itself, or, in the case where the optical filter has not been treated by a lapping or polishing process of the entry and/or exit faces of the channels, with reference to the case where the entry and/or exit faces are optically coupled to a panel or to a layer or to a film or, more generally, to a transparent planar element, e.g. by means of a glue achieving a refractive index matching between the channels and said transparent planar element.

In the context of the present description and in the appended claims, a (entry or exit) face of a channel is said to be 'substantially overlapping', or hereinafter simply 'overlapping', on an (entry or exit) surface of the optical filter when at least one point of the face of the channel belongs to the surface, for example when the whole face belongs to the surface, in the case of a flat face, or for example when the perimeter of the face belongs to the surface, in the case of a curved face.

The optical filter of the present invention enables ghost images to be removed by producing a single sharp image of the sun thanks to the first element of optically absorbing material positioned inside the filter. This first element of optically absorbing material is in fact configured and arranged so as to remove at the origin the cross-talk between the channels, without making an excessive geometric cut on the components that generate, outside the filter, the light that propagates to the larger angles inside the acceptance cone, and without therefore excessively reducing the lighting of the edge of the image of the sun that is formed on the retina of the observer.

Furthermore, the optical filter of the present invention is capable of producing a circular image of the sun, making the use of a low-angle diffuser filter superfluous.

Both of these aspects advantageously prevent a blurring of the image of the sun.

The essential role of the radial profile of refractive index of the channels emerges when considering a matrix of parallel and cylindrical absorbing channels without a radial profile of refractive index. In this case, the rays that are not absorbed are (only) those that propagate along the axis of the channels, and thus contribute to forming the central portion of the far-field image. On the contrary, as regards the rays that propagate in other directions, only a part of them is transmitted by the matrix, this part being the smaller the greater the angle of the rays with respect to the axis, and reducing to zero for directions that cross the channel passing from one edge at the entry to the opposite edge at the exit. Therefore, the far-field image will not be uniformly illuminated (or, equivalently, the angular luminance profile will not be constant), such an image having on the contrary a bell-shaped illuminance profile, which fades and cancels out at the edge of the image, thus not being able to offer a clear leap in the luminance profile for the observer looking at the light emitted by the source. It should be noted that the introduction of a matrix of lenses positioned on the entry apertures and having a focal length in the medium equal to the length of the channels would not change the result. In fact, an extreme point at the edge of the image in the far field is always illuminated only by the single ray that crosses the channel passing from one edge at the entry to the opposite edge at the exit.

On the contrary, in the case of a matrix of parallel absorbing channels, e.g. channels substantially cylindrical or not very different from cylindrical channels, e.g. channels with hexagonal section or close to a hexagonal section, in association with a radial profile of refractive index of the channels, such that the light rays crossing any channel of the plurality of the channels passing through any point on the edge of an entry face of the channel exit through the exit face of the channel with substantially parallel directions, each channel produces in the far field the image of the field present on the entry face of the channel, i.e., the image of the entry opening of the channel. Here the central point of the entry opening will be reproduced in the image by the rays belonging to a first beam of rays, substantially formed by all the rays originating from this central point and reaching the exit opening. Conversely, a point at the edge of the image in the far field will be illuminated by the rays of a second beam formed by all the rays originating from a point at the edge of the entry opening and reaching the same exit opening. This results in the image of the entry opening that is formed in the case of such a matrix of channels to be sharp. In fact, it is characterized by having, for example, a circular shape and an edge beyond which the illuminance discontinuously cancels out (in other words, the angular luminance profile exhibits a sharp transition from a finite field edge value to zero, for directions passing from the inside to the outside of the acceptance cone, the edge value being obtained not from a single ray, as in the case with no lens or the lens matrix positioned at the entry, but from a plurality of rays). Therefore, it is possible to produce a sharp image of the sun in the eye in sharp contrast to the surrounding sky.

More specifically, the radial profile of refractive index that makes parallel the rays belonging to a second beam of rays emerging from a point on the edge of the entry face of the channel, makes substantially parallel the rays belonging to any beam emerging from any point on the entry face, including the rays belonging to the first beam of rays emerging from the central point on the entry face. In other words, the radial profile of refractive index is configured such that the channel behaves substantially like a lens, called "GRIN (GRade iNdex) lens", having optical axis coincident with the axis of the channel and a focal length in the medium substantially equal to the length of the channel. By symmetry, the direction by which the rays belonging to the first beam emerge from the exit face is necessarily the direction of the axis of the channel.

In accordance with a second aspect thereof, the invention relates to an optical filter configured to transform an incident light into a filtered light having an angular luminance profile characterized by a first substantially constant value for emission directions comprised within an angular acceptance cone and a second substantially zero value for emission directions outside the angular acceptance cone, wherein the optical filter comprises a substantially flat entry surface, a substantially flat exit surface parallel to the entry surface, a plurality of cylindrical elements made of a substantially light-transparent material, a first element of optically absorbing material configured and arranged with respect to the cylindrical elements so as to prevent the passage of light between adjacent cylindrical elements of the plurality of cylindrical elements, a second element of optically non-transparent material configured and arranged with respect to the cylindrical elements so as to prevent the passage of light parallel to the cylindrical elements and externally thereto through the interspaces between adjacent cylindrical elements.

The cylindrical elements of the plurality of cylindrical elements have a substantially identical conformation between them and comprise a substantially circular entry face having a diameter of the cylindrical elements, a substantially circular exit face having the diameter of the cylindrical elements, and a lateral surface extending perimetrically between the entry face and the exit face over a length of the cylindrical elements.

The cylindrical elements are arranged side by side and parallel to each other, so that a plurality of interspaces are defined between adjacent cylindrical elements. Further, the cylindrical elements have a cylinder axis perpendicular to the entry and exit surface and are arranged with the entry face substantially overlapping the entry surface and with the exit face substantially overlapping the exit surface.

The cylindrical elements have a refractive index whose value depends on the distance from the cylinder axis, so that a radial profile of refractive index of the cylindrical elements is defined.

The radial profile of refractive index of the cylindrical elements is configured such that the light rays crossing any one cylindrical element of the plurality of cylindrical elements and belonging to a beam of rays emerging from any one point on an edge on an entry face of the cylindrical element exit the exit face of the cylindrical element with substantially parallel directions.

Advantageously, the optical filter in accordance with the second aspect achieves the technical effects described above in relation to the optical filter according to the first aspect. In particular, the optical filter in accordance with the second aspect is the optimal solution in order to obtain the image of a perfectly circular sun.

Advantageously, the optical filter in accordance with the first and second aspect of the present invention is of simple and economical technological feasibility and at the same time it allows for industrially scalable production. It is in fact extremely simple to produce a plurality of parallel, light-transparent channels as well as to optically isolate them with absorbing material, using, for example, well-established technologies such as that of optical fibers, and in particular those of the so-called “fiber optics face plates”.

In accordance with a further aspect thereof, the invention relates to a lighting device to reproduce the light of the sky and the sun comprising a direct light source configured to emit visible light in a non-isotropic manner and having a first correlated colour temperature or CCT, an optical filter as described above, positioned downstream of the direct light source so that the entry surface of the optical filter is at least partially overlapping a flat surface of emission of the direct light of the direct light source; and a diffused light source configured to emit a diffused visible light having a second correlated colour temperature or CCT equal to at least 1.2 times, preferably at least 1.3 times, more preferably at least 1.5 times greater than the first CCT.

The direct light source comprises a visible light emitter, an optical system for collimating the light emitted by the visible light emitter and the flat surface of emission of the direct light. Further, the direct light source is configured to generate a light mainly along directions comprised within an emission cone having a directrix of the emission cone perpendicular to the flat surface of emission of the direct light and having an angular half-opening of direct light, defined as the half-width of the angular luminance profile of the direct light source on the flat emission surface, lower than 20 degrees, preferably lower than 15 degrees, more preferably lower than 8 degrees, wherein the half-width is measured at a height equal to $1/e^2$ times the peak value and the angular luminance profile is averaged over the spatial coordinates and the azimuth coordinate.

The diffused light source comprises a diffuser panel positioned downstream of the optical filter so as to intercept at least partially a filtered light emitted by the exit surface of the optical filter. The diffuser panel is further configured to transmit or reflect part of the filtered light emitted by the exit surface of the optical filter, producing a transmitted or reflected light whose angular luminance profile substantially coincides with the angular luminance profile of the filtered light emitted by the exit surface of the optical filter. Again, the diffuser panel is configured to generate, on a diffused light emission surface, a diffused light component having an angular profile characterized by an angular half-opening of diffused light, defined as half-width of the angular luminance profile at height $1/e^2$, at least 2 times, preferably 3 times, more preferably 4 times greater than a half-opening of an acceptance cone of the optical filter and/or of an angular half-opening of the filtered light, defined as half-width of the angular luminance profile at height $1/e^2$ of the filtered light.

Advantageously, the lighting device to reproduce the light of the sky and the sun achieves the technical effects described above in relation to the optical filter according to the present invention.

The present invention may have at least one of the preferred following features; the latter may in particular be combined with one another as desired in order to meet specific application needs.

Preferably, the channels of the plurality of channels have on average an effective diameter comprised between 0.01 mm and 1 mm, more preferably between 0.03 mm and 0.5 m, more preferably between 0.05 and 0.2 mm, wherein the effective diameter of the channel $D_c$ is given $$D_c \equiv \frac{\sqrt{A_c}}{\pi}$$

and wherein $A_c$ is the area of the section of the channel and wherein the averaging is carried out over the plurality of the channels.

Preferably, the ratio of the effective diameter to the length of the plurality of the channels is on average comprised between 1/100 and 1/2, more preferably between 1/50 and 1/3, more preferably between 1/20 and 1/5.

In addition or in combination, the optical filter is characterized by an angular acceptance cone with an acceptance angle or cut-off angle measured as a flat angle of half-opening at the vertex comprised between 0.5° and 25°, preferably 1° and 20°, more preferably 2° and 12.5°, even more preferably 3° and 7.5°.

Preferably, the distance of at least one between the object plane and the image plane from the entry and/or exit surface is comprised between 0.7 $D_1$ and 1.5 $D_1$, more preferably between 0.8 $D_1$ and 1.3 $D_1$.

In a variant of the invention, the radial profile of refractive index of the channels is configured such that the light rays crossing any channel of the plurality of channels and belonging to a beam of rays emerging from any point on an edge of an entry face of the channel exit the exit face of the channel with substantially parallel directions, wherein the optical filter has an image plane and an object plane, the object plane being placed at a distance from the entry surface and/or the image plane being placed at a distance from the exit surface, the distance being measured along the direction of the channel axis and being comprised 0.5 $D_1$ and 2 $D_1$, preferably being comprised 0.7 $D_1$ and 1.5 $D_1$, more preferably being comprised 0.8 $D_1$ and 1.3 $D_1$, with $D_1$ being a nominal distance given by the relation:

$$D_1 \simeq \frac{2L}{n_a \pi}.$$

In a further variant of the invention, the channel axis is orthogonal to the entry surface and to the exit surface and the radial profile of refractive index of the channels is configured such that, when a reflecting surface is flanked by the exit surface, the light rays crossing any channel of the plurality of channels and belonging to a beam of rays emerging from any point on an edge of an entry face of the channel exit the entry face from the channel with substantially parallel directions, wherein the optical filter has an image plane and an object plane, the object plane being placed at a distance from the entry face and/or the image plane being placed at a distance from the exit face, the distance being measured along the direction of the channel axis and being comprised between 0.5 $D_1$ and 2 $D_1$, preferably being comprised between 0.7 $D_1$ and 1.5 $D_1$, more preferably being comprised between 0.8 $D_1$ and 1.3 $D_1$, with $D_1$ being a nominal distance given by the relation:

$$D_1 \simeq \frac{2.41L}{n_a}.$$

Advantageously, an optical filter according to the variant described above is ideal for use in combination with a reflecting surface to be flanked by the exit surface, wherein the image plane manifests itself in the absence of the reflecting surface.

In an alternative variant of the invention, the channel axis is orthogonal to the entry surface and to the exit surface and the optical filter comprises a reflecting surface positioned in an adjacent manner, preferably in contact, to the exit surface, wherein the radial profile of refractive index of the channels is configured such that the light rays crossing any channel of the plurality of channels and belonging to a beam of rays emerging from any point on an edge of an entry face of the channel exit the entry face with substantially parallel directions, wherein the optical filter has an image plane and an object plane, the object plane and/or the image plane being placed at a distance from the entry face measured along the direction of the channel axis, the distance being comprised between 0.5 $D_1$ and 2 $D_1$, preferably being comprised between 0.7 $D_1$ and 1.5 $D_1$, more preferably being comprised between 0.8 $D_1$ and 1.3 $D_1$, with $D_1$ being a nominal distance given by the following relation:

$$D_1 \simeq \frac{4L}{n_a \pi}.$$

Preferably, each channel has a regular polygonal section.

According to an alternative variant, each channel has a substantially elliptical section.

According to a further alternative variant, each channel has a non-polygonal concave or convex section.

According to an alternative variant, each channel has an irregular polygonal section, preferably a convex irregular polygonal section.

Preferably, the filter comprises a plurality of channels characterized by:

- a distribution of channels which are statistically equivalent to each other; and/or
- a distribution of channels with an averagely circular section; and/or
- a distribution of channels having section substantially not equal between them; and/or
- a distribution of channels having a substantially non-circular section.

Preferably, the channels are made of a material selected from the group comprising glass, quartz, PMMA, polycarbonate, or other polymer resin.

Preferably, the channels consist of GRIN lenses or GRIN fibers (GRade iNdex) having optical axis coincident with the channel axis and a focal length in the medium equal to the length of the channels.

Preferably, the first element of optically absorbing material comprises a sheath, a film, a varnish, or a layer of rigid material made of a first optically absorbing material substantially covering the lateral surface of the channels, having a first refractive index value lower than, equal to, or greater than a second refractive index value equal to the refractive index value of the channels in proximity to the lateral surface of the channels, or a refractive index value that depends on the distance from the axis of the channels.

Advantageously, a first refractive index value equal to the second refractive index value minimises the reflection at the interface, ensuring maximum contrast in the luminance profile. On the other hand, a first refractive index value lower than the second refractive index value causes the rays crossing the first element of optically absorbing material to deviate towards the exit surface, increasing the path within the first optically absorbing material and thus allowing the desired absorption to be obtained with the minimum thickness. The same is true for the case in which the channels are made in the form of cylindrical elements and for the case of a refractive index value that depends on the distance from the axis of the cylindrical elements, where the index profile can be configured to obtain the maximum deviation and therefore the maximum absorption with minimum reflection at the interface.

Preferably, the absorption coefficient of the first optically absorbing material ensures an absorption of at least 10%, preferably at least 25%, more preferably at least 40% of the visible light for a material thickness equal to 1/5, preferably 1/10 of a diameter of the entry face or of the exit face of the channels.

Preferably, the absorption coefficient of the first optically absorbing material ensures an absorption of at least 50%, preferably at least 80%, more preferably at least 90% of the visible light for a material thickness equal to 1/5, preferably 1/10 of a diameter of the entry face or of the exit face of the channels.

Preferably the optical filter, with particular reference to the absorption coefficient of the first optically absorbing material, to the thickness of the first element optically absorbing material and to the opening angle of the angular acceptance cone, is configured so that it ensures an absorption of at least 70%, preferably at least 80%, more preferably at least 90%, even more preferably at least 95% of the visible light entering each channel at an angle close to the opening angle of the angular acceptance cone with respect to the direction of the axis of the channel, wherein close is understood to be in the neighbourhood of ±3°, preferably ±2°, more preferably ±1°.

Preferably, the minimum distance between surfaces of adjacent channels and/or the minimum thickness of an interspace between adjacent channels and/or the minimum thickness of the first element of optical material are on average greater than 1 m, preferably greater than 5 m, more preferably greater than 10 μm, the average being carried out on the plurality of channels.

Preferably, the maximum distance between surfaces of adjacent channels and/or the maximum thickness of an interspace between adjacent channels and/or the maximum thickness of the first element of optical material are on average lower than 100 μm, preferably lower than 50 μm, more preferably lower than 30 μm, the average being carried out on the plurality of channels.

Preferably, the at least one element of optically absorbing material configured and arranged with respect to the channels so as to reduce or, substantially prevent the passage of light between adjacent channels of the plurality of channels and so as to reduce or substantially prevent the passage of light parallel to the channels and externally thereto, and/or the layer of rigid material is an optically absorbing material that fills the interspaces between adjacent channels, for example that fills at least 50%, preferably at least 70%, preferably at least 90% of the volume of the interspaces between adjacent channels.

Preferably, the layer of rigid material is made of the same material as the one of the channels.

Advantageously it is thus possible to have the technology of optical fibers and in particular of the "fiber optics face plates" for the realization of the device.

Alternatively, the first element of optically absorbing material is a jacket, for example a cylindrical jacket, which substantially covers the lateral surface of the channels, for example made in the form of cylindrical elements.

In particular, in the case of channels made in the form of cylindrical elements characterized by a diameter of cylindrical element, the jacket preferably has a thickness significantly lower than the diameter of the cylindrical elements, for example a thickness 2 times, preferably 5 times, more preferably 10 times lower, and wherein the cylindrical jacket comprises a layer of rigid material.

Preferably the layer of rigid material is made of a first optically absorbing material, for example selected from the group comprising glass, quartz, PMMA, polycarbonate, or other polymer resin in a form made optically absorbent by adding light absorbing components.

Alternatively or in addition, the layer of rigid material is covered on one of its external lateral surfaces by the second element of optically non-transparent material, preferably in the form of paint or film or sheath of optically absorbing material.

In a variant of the filter according to the invention, the second element optically non-transparent material comprises a second optically absorbing material that at least partially fills the plurality of interspaces defined between adjacent channels.

Preferably, the absorption coefficient of the second optically absorbing material ensures an absorption of at least 50%, preferably at least 80%, more preferably at least 90% of the visible light for a thickness equal to 1/5 preferably 1/10 of the length of the channels.

Preferably, the first and the second optically absorbing materials are the same material.

Alternatively, the first and/or the second optically absorbing material has a glass transition temperature Tg different from a glass transition temperature of the material of which the channels of the plurality of channels are made, e.g. different by at least 5, preferably 10, more preferably 20 degrees Celsius.

Advantageously, it is thus possible to obtain the filling of the interspaces between channels by the first and/or second material, which are suitably heated and/or pressurised.

Preferably, the first optically absorbing material is a thermosetting resin and the second optically absorbing material is a thermoplastic resin and wherein the curing temperature Ti of the first optically absorbing material is lower than the glass transition temperature Tg of the second material.

This expedient advantageously makes it possible to have a sheath of a first optically absorbing material having the necessary flexibility to allow managing the fiber, for example in order to manage the winding, before the process of creating the channels, and to then give this first material the necessary rigidity, for example to promote the cutting process and in any case to give stability to the system, and in any case to guarantee the thickness at the point of maximum proximity to the channels.

Alternatively, the second element of optically non-transparent material comprises an element of absorbing or reflecting material covering and/or constituting at least a portion of the entry surface and/or of the exit surface not comprising the portions overlapping the entry and exit faces of the channels.

In a variant of the filter according to the invention in which the channels are made in the form of cylindrical elements, the average value of a spacing between adjacent cylindrical elements is lower than 2 times, preferably 1.5 times, more preferably 1.2 times the diameter of the cylindrical elements.

Preferably, the diameter of the entry or exit face of the cylindrical elements is lower than 5 mm, preferably 3 mm, more preferably 2 mm.

In a variant of the lighting device according to the invention, the direct light source is configured to produce, on the flat emission surface, a substantially spatially uniform cone illuminance, wherein the cone illuminance is the illuminance relative only to the contribution of the light impinging from directions comprised within the emission cone.

In a variant of the lighting device according to the invention, the diffuser panel is configured to generate, on a diffused light emission surface, a diffused light component characterized by a substantially spatially uniform luminance.

In a variant of the lighting device according to the invention, the optical filter is configured to have a half-opening of an angular acceptance cone equal to the arctangent of the ratio of a half-diameter of the entry face or of the exit face of the cylindrical elements to the length of the cylindrical elements, greater than or equal to the angular half-opening of direct light.

Preferably, the angular half-opening of direct light is greater than 1.5, preferably 2.5, more preferably 3 degrees.

Surprisingly, the Applicant has acknowledged the possibility of dispensing with the production of sharp shadows, i.e. the possibility of accepting to produce in the eye an image of the sun that is even much bigger than that of the real sun which has an angular half-opening of 0.25 degrees, thus allowing to simplify considerably the necessary technology without compromising the functionality of the device. The reason why this can happen specifically concerns the ability of faithfully reproducing in an indoor environment the correct brightness, and therefore the perceived colour, of the scenes in the shade compared to those in the sun. Indeed, it is precisely the characteristic of the shadows that determines the difference between natural and artificial light, making us perceive the difference between indoor and outdoor. To this end, it is important to note that what in nature determines the brightness of the shadows is the total luminous flux coming from the sky, which in turn depends on the width of the solid angle from which the sky illuminates the scene. This is why, due to the limited opening of windows and skylights, the shadows produced inside by the actual sun and sky are darker, and perceptually less coloured, and therefore less "natural" than those we are used to seeing outdoor. In the new proposed solution, the correct balance between shadow and light of the outdoor is re-established thanks to the increased divergence of sunlight, compared to the light of the sky, which instead is reproduced in a natural way. In fact, this increase in the ratio between the divergences leads to an equal reduction in the ratio between the illuminances, which restores the natural ratio between the illuminance of the sky and the sun despite the limited opening of the device. In other words, the effect on the shadows of an artificial window with increased sun divergence is similar to that of a natural window with a greater opening, which obviously has a significant impact on the commercial value of the product.

In a variant of the lighting device according to the invention, the first direct light source is configured to ensure variations of the cone illuminance on at least 90% of the flat emission surface that are lower than 100%, preferably lower than 70% more preferably lower than 50% of the average cone illuminance value on the first surface.

Conveniently, limiting the cone illuminance variations in turn limits the luminance variations of the optical filter and thus the luminance variations it can produce on the diffuser panel, the presence of which reduces the perceived quality of the sky.

In a variant of the lighting device according to the invention, the first direct light source is configured to ensure a substantially monotonic dependence of the cone illuminance value of the spatial coordinates on at least 90% of the flat surface of emission of the direct light.

Advantageously, a monotonic variation of the cone illuminance implies a monotonic variation of the luminance of the sky, which may not only be acceptable but also welcome as it is a naturally occurring effect.

In a variant of the lighting device according to the invention, the cone illuminance is greater than 80%, preferably greater than 90%, more preferably greater than 95% of the total illuminance produced by the direct light source on the flat surface of emission of the direct light.

In a variant of the lighting device according to the invention, the visible light emitter is of the linear type comprising a plurality of LEDs arranged along a straight line perpendicular to a section plane orthogonal to the entry surface and to the exit surface of the optical filter.

Preferably, the optical system for collimating the light emitted by the visible light emitter of the linear type comprises a plurality of refractors and/or reflectors, such as lenses, TIR lenses, Fresnel lenses, reflectors, CPCs, etc., each coupled to each LED of the plurality of LEDs, and configured to collimate the light of the LED to which it is coupled in a first collimation plane containing the straight line along which the LEDs are arranged, and to give the collimated light an angular luminance profile, for directions comprised in the first collimation plane, having an angular half-opening whose value is comprised between 0.5 and 2, preferably between 0.7 and 1.5, more preferably between 0.85 and 1.2 times the value of the angular half-opening of direct light.

Preferably, the optical system for collimating the light emitted by the visible light emitter of the linear type comprises a Fresnel mirror having a first flat non-reflecting surface and a second prismatic reflecting surface, wherein the Fresnel mirror is positioned and configured such that the first non-reflecting flat surface is perpendicular to the orthogonal section plane and the second prismatic reflecting surface collimates the light emitted by the visible light emitter in a second collimation plane parallel to the orthogonal section plane and, for directions comprised in the second collimation plane, gives the thus collimated light an angular luminance profile having an angular half-opening whose value is comprised between 0.5 and 2, preferably between 0.7 and 1.5, more preferably between 0.85 and 1.2 times the value of the angular half-opening of direct light.

Preferably, the filter is configured to remove at least 80%, preferably at least 90%, more preferably at least 95% of the stray light produced by the Fresnel mirror.

Conveniently, realizing the collimation of the light produced by the direct light source in two independent stages, on orthogonal collimation planes, allows realizing the collimation in the second plane using a single optical element, instead of a plurality of optical elements, with a significant reduction in costs.

In a variant of the lighting device according to the invention, the diffused light source comprises a panel of transparent material comprising a dispersion of nanoparticles, the panel being configured to transform the filtered light into a transmitted component, having similar angular profile and CCT at least 1.1, preferably 1.2, more preferably 1.3 times lower than the first CCT, and into a diffused component with CCT equal to at least 1.2 times, preferably at least 1.3 times, more preferably at least 1.5 times greater than the first CCT.

In a variant of the lighting device according to the invention, the diffused light source comprises a nanostructured reflector configured to transform the filtered light into a reflected component, having similar angular profile and CCT at least 1.1, preferably 1.2, preferably 1.3 times lower than first CCT, and into a diffused component with CCT equal to at least 1.2 times, preferably at least 1.3 times, more preferably at least 1.5 times greater than the first CCT.

In a variant of the lighting device according to the invention, the diffused light source comprises a diffuser panel that diffuses the light produced by a second plurality of LEDs coupled to the sides of the panel.

In a variant of the lighting device according to the invention, the diffused light source is configured such that the average value of the divergence at half-height HWHM of the light transmitted or reflected by it is lower than 1.5, preferably 1.3, more preferably 1.2 times the average value of the divergence at half-height HWHM of the filtered light.

BRIEF DESCRIPTION OF THE DRAWINGS

The accompanying drawings, which are incorporated herein and form part of the description, illustrate exemplary embodiments of the present invention and, together with the description, are intended to illustrate the principles of the present invention.

In the drawings.

DETAILED DESCRIPTION

Figure 1:
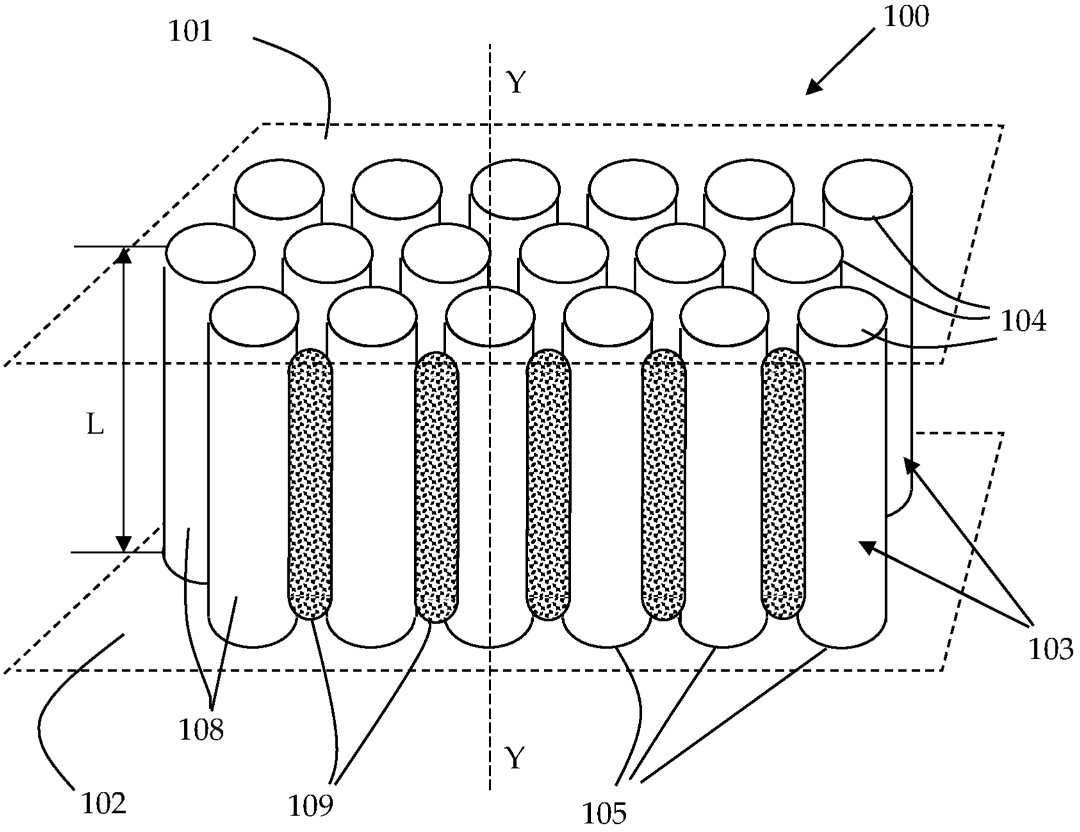
FIG. 1 is a schematic perspective view from above of a first embodiment of an optical filter according to the present invention.

The following is a detailed description of exemplary embodiments of the present invention. The exemplary embodiments described herein and illustrated in the drawings are intended to convey the principles of the present invention, allowing the person skilled in the art to implement and use the present invention in numerous different situations and applications. Therefore, the exemplary embodiments are not intended, nor should they be considered, to limit the scope of patent protection. Rather, the scope of patent protection is defined by the attached claims.

For the illustration of the drawings, use is made in the following description of identical numerals or symbols to indicate construction elements with the same function. Moreover, for clarity of illustration, certain references may not be repeated in all drawings.

The use of “for example”, “etc.”, “or” indicates non-exclusive alternatives without limitation unless otherwise indicated. The use of “comprises” and “includes” means “comprises or includes, but not limited to”, unless otherwise indicated.

Furthermore, the use of measures, values, shapes and geometric references (such as perpendicular and parallel) associated with terms such as “approximately”, “almost”, “substantially” or similar, is to be understood as “without measurement errors” or “unless inaccuracies due to manufacturing tolerances” and in any case “less than a slight divergence from the values, measures, shapes or geometric references” with which the term is associated.

Finally, terms such as “first”, “second”, “upper”, “lower”, “main” and “secondary” are generally used to distinguish components belonging to the same type, not necessarily implying an order or a priority of relationship or position.

With reference to the figures, some embodiments of an optical filter according to the present invention are schematically illustrated, indicated as a whole with 100, 100', 100'',100'''. The optical filter 100, 100',100'',100''' comprises a substantially flat entry surface 101, a substantially flat exit surface 102 parallel to the entry surface, and a plurality of channels 103 made of a substantially light-transparent material extending between the entry surface 101 and the exit surface 102. “Substantially flat” is understood to mean at least locally flat, i.e. flat over an area having a diameter at least 10 times, preferably 30 times, more preferably 100 times the length of the channels. “Substantially transparent material” is understood to mean a substantially transparent solid material, such as glass, quartz, PMMA, polycarbonate, or other polymer resin. The channels 103 of the plurality of channels comprise an entry face 104, an exit face 105 and a lateral surface extending perimetrically between the entry face 104 and the exit face 105 over a length L of the channels 103. The channels are arranged side by side and parallel to each other, so as to define a plurality of interspaces between adjacent channels 103. Further, the channels 103 have a channel axis Y passing through a centre of gravity of a section of the channel 103 and incident on the entry 101 and exit 102 surface and are arranged with the entry face 104 substantially overlapping the entry surface 101 and with the exit face 105 substantially overlapping the exit surface 102. There is also provided at least one element of optically absorbing or non-transparent material 108,109 configured and arranged with respect to the channels 103 so as to reduce or substantially eliminate the passage of light between adjacent channels 103 of the plurality of channels and so as to reduce or substantially eliminate the passage of light parallel to the channels and externally thereto. Alternatively, there is provided a first element of optically absorbing material 108 configured and arranged with respect to the channels 103 so as to reduce or substantially eliminate the passage of light between adjacent channels 103 of the plurality of channels, and a second element of optically non-transparent material 109 configured and arranged with respect to channels 103 so as to prevent the passage of light parallel to the channels and externally thereto through the interspaces between adjacent channels 103. In particular, the channels 103 have a refractive index whose value decreases starting from a maximum refractive index $n_a$ along a radially outward direction away from the channel axis Y passing through the centre of gravity of section of the channel 103, so as to define a radial profile of refractive index of the channels.

In the context of this description and in the following claims,

"maximum refractive index $n_a$" is understood to mean a maximum refractive index that is substantially common to all channels;

the expression "channel" is understood to mean a solid conforming to an extruded solid, that is a solid that extends along a longitudinal axis having a substantially constant section orthogonal to the longitudinal axis; and the expression "axis of/of the channel", or "longitudinal axis" or "longitudinal axis Y-Y" are understood to equivalently indicate an axis of/of the channel.

According to the present invention, the radial profile of refractive index of the channels 103 is configured such that the light rays crossing any channel 103 of the plurality of channels and belonging to a beam of rays emerging from any point on an edge of an entry face 104 of the channel exit the channel with substantially parallel directions. In an embodiment of the optical filter 100,100', 100",100'", such as by way of non-limiting example any of the cases illustrated in the figures, the channels 103 are elements made of a material preferably selected from the group comprising glass, quartz, PMMA, polycarbonate, or other polymer resin.

In the exemplary and non-limiting embodiment of FIG. 1, the channels 103 are cylindrical elements with substantially circular section, identical to each other made of a material, preferably selected from the group comprising glass, quartz, PMMA, polycarbonate, or other polymer resin. Each cylindrical element 103 has a flat entry face 104, perpendicular to the axis Y of the cylinder, and a flat exit face 105 parallel to the entry face 104. Both the entry 104 and exit 105 faces are substantially circular, have a diameter equal to a diameter of a cylindrical element, and have optical quality, i.e. they are arranged so as to transmit the light incident on them with minimum distortion. Alternatively, with reference to both the case of FIG. 1 and in general to all configurations according to the present invention, the entry faces 104 and/or the exit faces 105 of the channels may have a surface roughness, for example a surface roughness that prevents an effective transmission of the light without distortion. More particularly, the entry faces 104 and/or the exit faces 105 of the channels may have a surface roughness and the entry surface 101 and/or the exit surface 102 are arranged to be optically coupled to a plate or panel or layer of transparent material, not illustrated, for example by means of a transparent gluing material so as to allow the passage of the light from the panel or plate or layer of transparent material, to the channels of the plurality of channels in the absence or with minimal distortion or diffusion. In an alternative configuration not illustrated in the figure, the optical filter 100, 100', 100", 100'" comprises at least one panel or plate or layer of optically transparent material optically coupled to the entry or exit surface of the filter.

With reference to the embodiment of FIG. 1, the cylindrical elements 103 have a radial profile of refractive index such as to give the cylindrical elements 103 the property of a converging lens having optical axis coincident with the axis Y of the cylinder and a focal length in the medium substantially equal to the length L of the cylinder.

In a particular embodiment, such as, by way of non-limiting example, the cases illustrated in FIG. 1 and FIGS. 2*a*,2*b*,2*c*, the optical filter 100,100',100",100" has the channel axis Y perpendicular to the entry surface 101 and to the exit surface 102 of the optical filter 100,100'". However, in a completely general way, the channel axis Y of the optical filter 100,100'" according to the present invention may have any inclination with respect to the normal to the entry 101 or exit 102 surface, for example an inclination comprised between 10° and 80°.

In the context of the present description and in the following claims, the property of an optical filter 100,100'" of being configured such that "the light rays crossing any channel 103 of the plurality of channels and belonging to a beam of rays emerging from any point on an edge of an entry face 104 of the channel exit an exit face 105 of the channel with substantially parallel directions" is understood to be equivalently verified if said optical filter 100, 100'" can be associated with an "object plane" in front of and parallel to an entry surface 101 and an "image plane" behind and parallel to an exit surface 102 such that a light source with linear shape and lying on the object plane along a source direction substantially orthogonal to the channel axis Y produces in the image plane an image of said source, i.e., it produces an illuminance profile characterized by a contrast along a direction orthogonal to the aforesaid source direction and/or by a peak illuminance value that are respectively greater than the contrast and/or the peak illuminance value obtained in any other plane behind the exit surface 102 and in front of the image plane, and wherein the object plane is placed at a distance D from the entry surface 101 and/or the image plane is placed at a distance D from the exit surface 102, wherein the distance D is comprised between 0.5 $D_1$ and 2 $D_1$, preferably comprised between 0.7 $D_1$ and 1.5 $D_1$, more preferably comprised between 0.8 $D_1$ and 1.3 $D_1$, with $D_1$ being a nominal distance given by the following relation:

$$D_1 \simeq \frac{2L}{n_a \pi}$$

wherein:

the nominal distance $D_1$ is measured along the direction of the channel axis Y, L is the length of the channels 103 and $n_a$ is the maximum refractive index and where the terms "in front" and "behind" are to be understood with respect to a direction of propagation of the light generated by the light source with linear shape and crossing the multichannel filter 100.

In the context of the present description and in the following claims, the property of an optical filter 100,100'" of being configured such that "the light rays crossing any channel 103 of the plurality of channels and belonging to a beam of rays emerging from any point on an edge of an entry face 104 of the channel exit the channel—in this case the exit face 105 of the channel—with substantially parallel directions" is understood to be equivalently verified if each channel 103 of the plurality of channels of the optical filter 100,100''' has a radial profile of refractive index such as to give the channel 103 the property of a converging lens having optical axis coincident with a channel axis and a focal length f in the medium substantially equal to the length of the channel L. Particularly, the aforesaid property of an optical filter 100,100''' is understood to be verified if each channel 103 of the plurality of channels has a radial profile of refractive index such as to give the channel 103 the property of a converging lens having a focal length f in the medium satisfying the relation 0.5 L<f<2L, preferably 0.7 L<f<1.6L, more preferably 0.7 L<f<1.4L, even more preferably 0.9 L<f<1.2L, wherein L is the length of the channel.

With reference to the embodiment of FIG. 1, the cylindrical elements 103 are arranged side by side and parallel to each other, in a maximum packing condition according to a substantially hexagonal pattern, and having the entry face 104 positioned on a same flat entry surface 101 as the filter 100 and the exit face 105 positioned on a same flat exit surface 102 as the filter and parallel to the entry surface 101.

The cylindrical elements 103 have a lateral surface substantially covered under conditions of optical contact (without gaps) by a first element of optically absorbing material 108, for example in the form of a sheath, film or varnish, or layer of rigid material having a refractive index substantially equal to the refractive index of the material of which the cylindrical elements 103 are made. In particular, the first element of optically absorbing material 108 is arranged and configured to prevent the passage of light between adjacent cylindrical elements.

The interspaces between adjacent cylindrical elements 103 are at least partially filled by a second element made of optically absorbing material 109, which is different from or the same as the first material 108, so as to prevent the passage of light parallel to the cylindrical elements and externally thereto through the interspaces between adjacent cylindrical elements 103.

Advantageously, an optical filter 100 where each channel has a cylindrical conformation having a substantially circular section allows, e.g., in the case of a diffused lighting source, to produce an angular profile of luminous intensity independent of the azimuth angle, so that an optical filter comprising a plurality of such channels produces an angular luminance profile independent of the azimuth angle, as necessary in order to be able to reproduce the image of a round sun.

Note that if the axis of the channel Y is inclined with respect to the normal to the entry or exit surface by an angle α (not illustrated) other than 0, the shape from the section of each channel may be obtained, for example, by projecting the entry face 104 or the exit face 105 of the channel onto the plane orthogonal to the axis of the channel Y, i.e., on the section plane.

A method for producing an optical filter 100 according to the invention provides for modifying the technology known in the field of optical fibers and used to produce the optical filters commonly referred to as "fiber optics face plates" by using as a preform element for the fiber spinning process a preform element of the type used for the production of GRIN fibers (GRade index optical fibers), e.g., a preform element of cylindrical section, wherein said preform element has a radial profile of refractive index equal to the average of the radial profiles of the refractive indexes of the channels 103 of the plurality of channels 103 of the optical filter 100, said average being carried out on all the channels and on all azimuth directions.

According to an alternative embodiment, such as those shown by way of non-limiting example in FIG. 3*a*,3*b*,4*a*,4*c*, the optical filter 100,100',100'',100''' comprises a plurality of channels circumscribed by a first element of optically absorbing material 108 made in the form of a layer of rigid material. By way of non-limiting example, such channels may be cylindrical channels identical to those used for the embodiment illustrated in FIG. 1 or in FIG. 2*a*,2*b*,2*c*. Alternatively, these channels may have sections having different areas, shapes, and orientations, as described below. The material of which the layer of rigid material is formed is preferably obtained by a modification of the material of which the channels 103 are constituted by adding light absorbing components. Preferably, the first element of optically absorbing material 108 is made of a material having a glass transition temperature lower than, equal to or greater than the glass transition temperature of the materials present in the cylindrical elements 103.

Figure 1A:
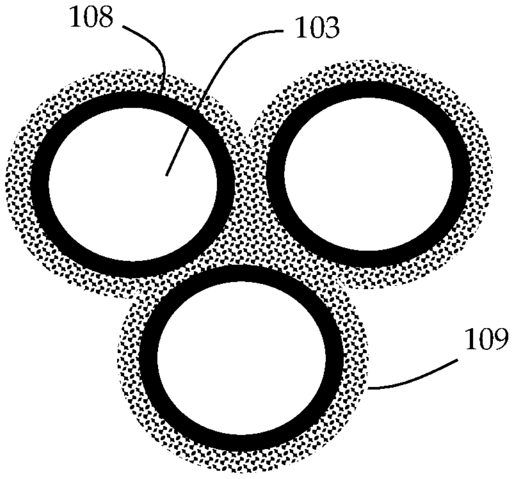
FIGS. 1*a* and 1*b* are two details of optical fibers used to make an optical filter according to the present invention.
Figure 1B:
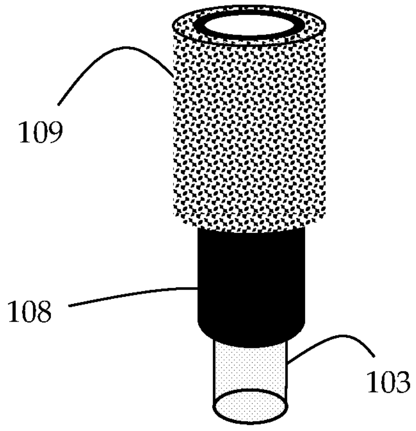

In a further embodiment illustrated in FIGS. 1*a* and 1*b*, there is also provided a sheath which externally wraps the first element of optically absorbing rigid material 108, made of a second optically absorbing material, which thus constitutes the second element of optically non-transparent material 109. Preferably, the sheath 109 is made of a material having a glass transition temperature lower than, equal to or greater than the glass transition temperature of the other materials present in the cylindrical elements 103 and in the first element of optically absorbing rigid material 108. Although the embodiment illustrated in FIGS. 1*a* and 1*b* explicitly refer to channels of cylindrical shape with circular section, this embodiment is equally applicable to channels of any shape.

Figure 2A:
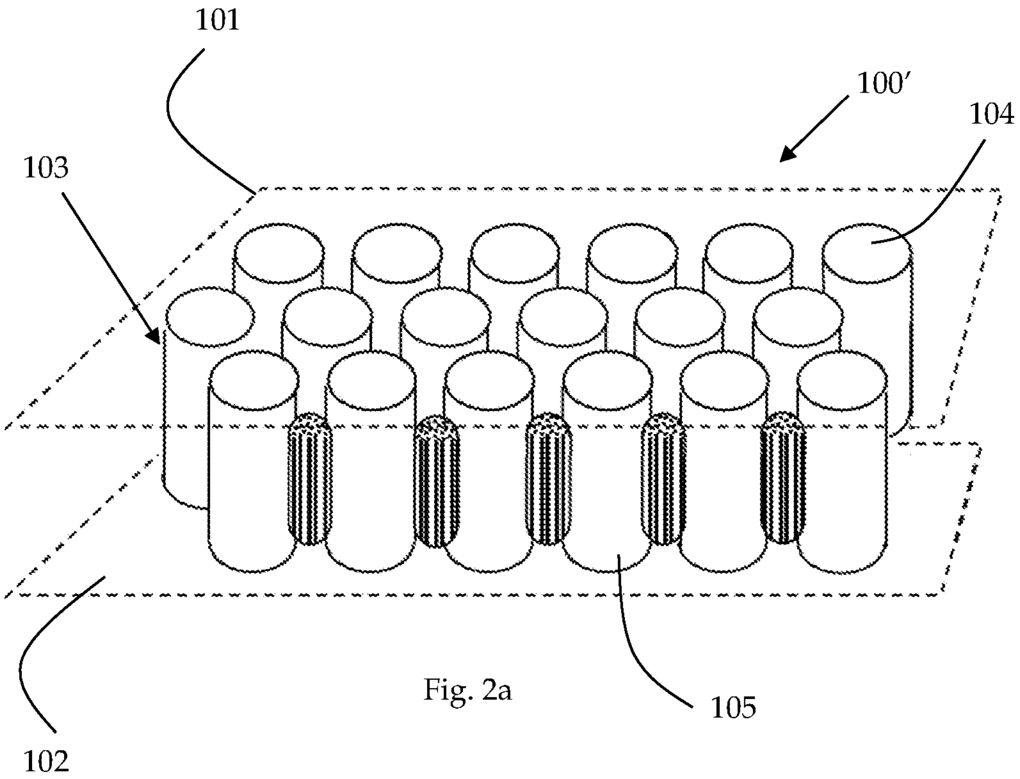
FIG. 2*a* is a schematic perspective view of a second embodiment of an optical filter according to the present invention.

With reference to FIG. 2*a* a second embodiment of the present invention is shown wherein the optical filter 100' comprises a plurality of channels 103 configured such that an "object plane" and an "image plane" as defined above can be associated therewith, the object plane being in front of and parallel to the entry surface 101 and the image plane being behind and parallel to an exit surface 102 of the plurality of channels 103, and wherein the object plane is placed at a distance D from the entry surface 101 and/or the image plane is placed at a distance D from the exit surface 102, wherein the distance D is comprised between 0.5 $D_1$ and 2 $D_1$, preferably comprised between 0.71 and 1.5 $D_1$, more preferably comprised between 0.81 and 1.3 $D_1$, with 1 being a nominal distance given by the following relation:

$$D_1 \simeq \frac{2.41L}{n_a}$$

where L is the length of the channels 103 of the plurality of channels. Preferably, the channel axis Y is substantially orthogonal to the entry surface 101 and to the exit surface 102.

For example, an optical filter 100' according to FIG. 2*a* is characterized by the same radial profile of refractive index as the optical filter 100 of FIG. 1 and a length of channels equal to ½ the length of the channels of the optical filter 100 of FIG. 1. The reduced optical power due to the shorter length of the channels 103 of the optical filter 100' of FIG. 2*a* with respect to the case of the optical filter 100 of FIG. 1 accounts for the greater distance of the object plane from the entry surface and/or of the image plane from the exit surface of the filter 100' of FIG. 2*a* with respect to the case of the optical filter 100 of FIG. 1. The optical filter 100' of FIG. 2*a* is suitable for use in combination with a reflecting surface flanked to one of the entry 101 or exit 102 surfaces of the filter.

Figure 2B:
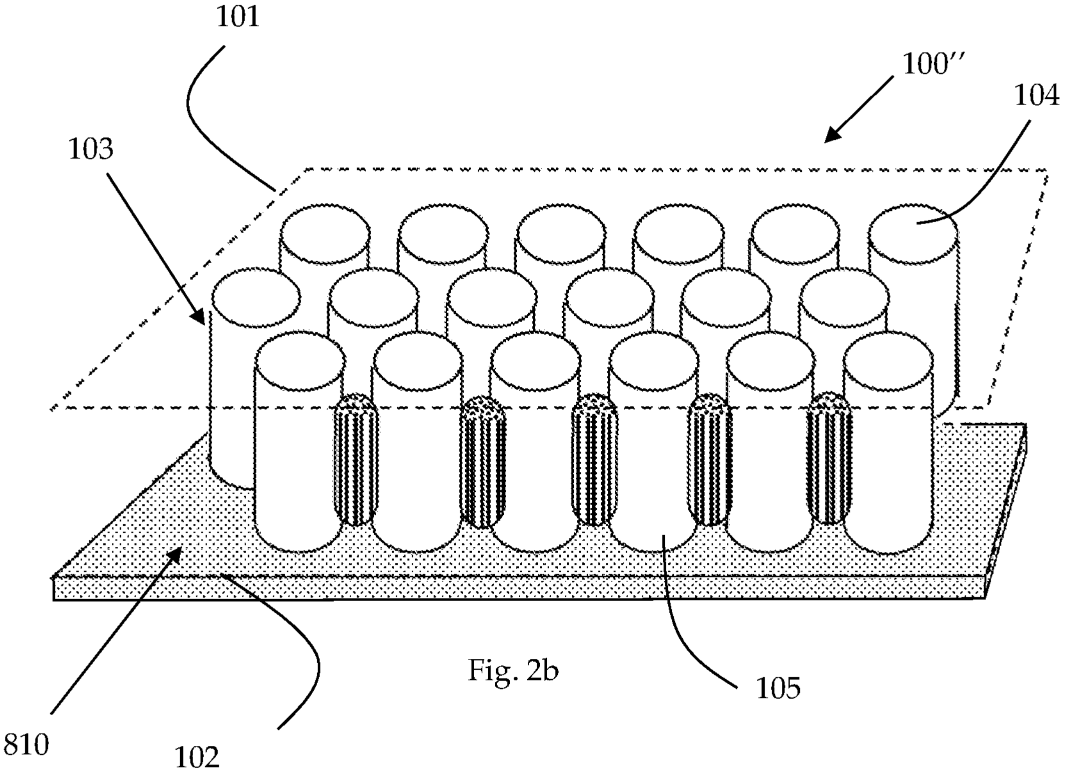
FIG. 2*b* is a schematic perspective view of a third embodiment of an optical filter according to the present invention.

With reference to FIG. 2*b* a third embodiment of the present invention is shown wherein the optical filter 100" additionally comprises a reflecting surface 810 coupled to the exit surface 102, for example a reflecting surface 810 placed side by side and/or glued and/or deposited to/on the exit surface 102, wherein the channel axis Y is orthogonal to the reflecting surface 810.

In particular, in this embodiment, the entry surface 101 acts both as entry and as exit of the light rays. Specifically, the reflecting surface 810 causes the light to pass twice through each channel 103 used in the optical filter 100", so that the path travelled by the light is equal to double the physical length L of the channels 103. In this case, the channels 103 of the plurality of channels 103 comprise an exit face 105 overlapping the exit surface 102 to which the reflecting surface 810 is coupled, and an entry face 104 acting as an entry and an exit of the light rays, and a lateral surface extending perimetrically between the entry face 104 and the exit face 105 over a length L of the channels 103.

Figure 2C:
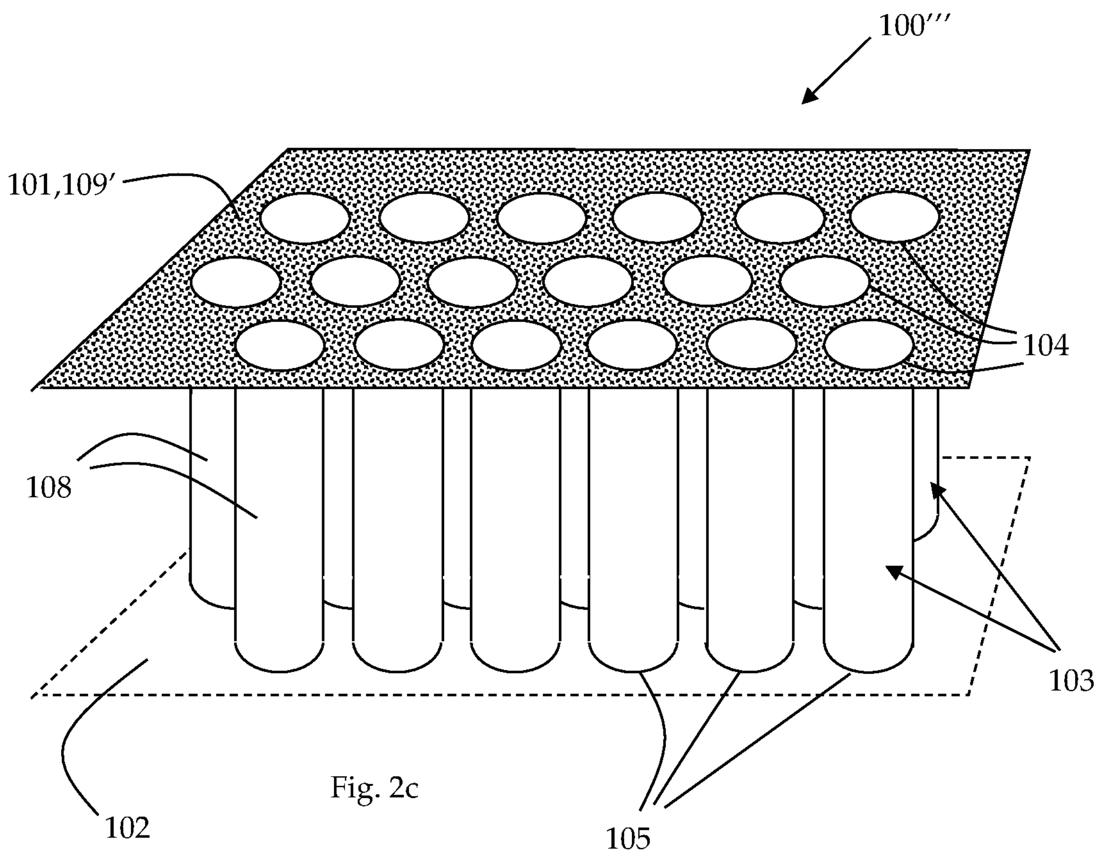
FIG. 2*c* is a schematic perspective view of a fourth embodiment of an optical filter according to the present invention.
Figure 3A:
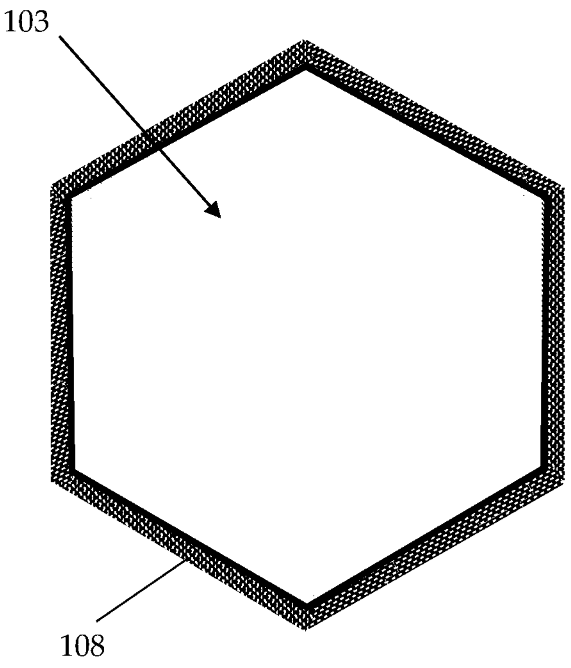
FIGS. 3*a* and 3*b* are schematic plan views, respectively, of a channel used to realize an optical filter according to a further embodiment of the present invention and of a surface portion of the optical filter according to said further embodiment of the present invention.
Figure 3B:
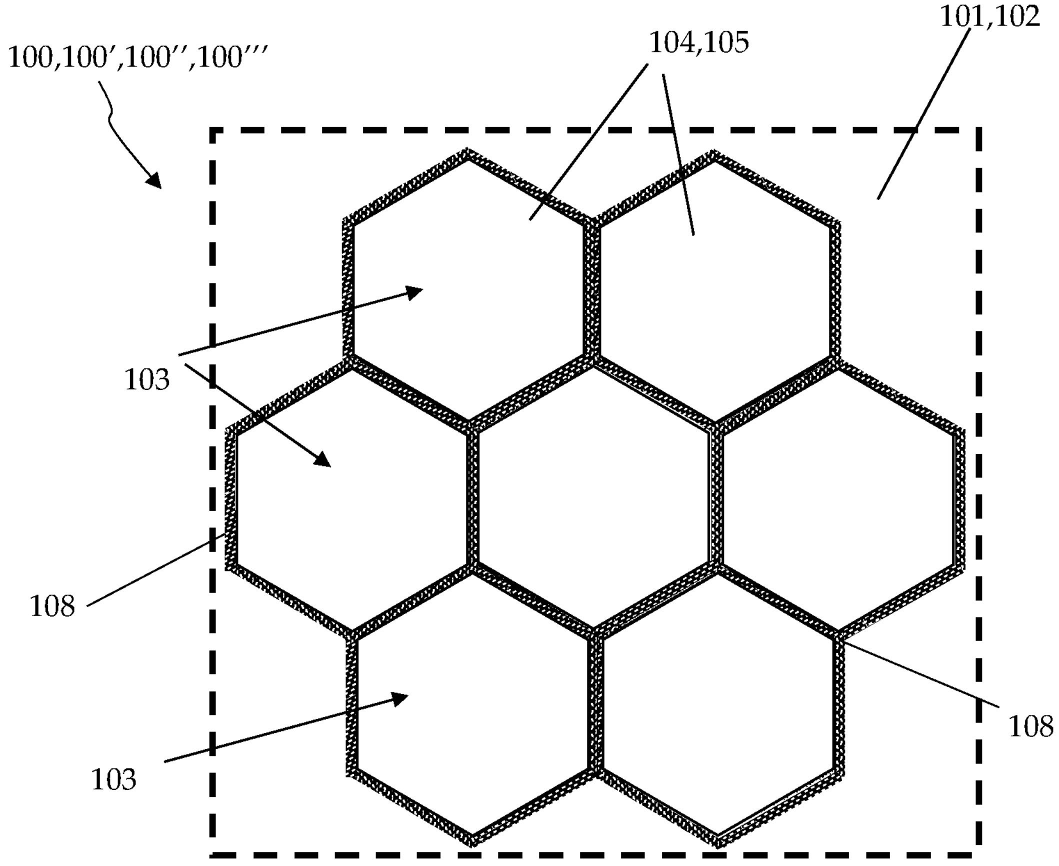

In the optical filter 100" of FIG. 2*c*, the plurality of channels 103 is configured such that "the light rays crossing any channel 103 of the plurality of channels and belonging to a beam of rays emerging from any point on an edge of the entry face 104 of the channel 103 exit the channel—in this case the same entry face 104 of the channel 103—with substantially parallel directions". In the context of the present description and in the following claims, this property is understood to be equivalently verified if the multi-channel optical filter 100" can be associated to an "object plane" and an image plane as defined above, and in particular an object plane and an image plane both on the side of the entry surface 101 and parallel thereto, for example an object plane substantially coincident with an image plane, and wherein the object plane and/or the image plane is/are placed at a distance D from the exit surface 102, wherein the distance D is comprised between 0.5 $D_1$ and 2 $D_1$, preferably comprised between 0.7 $D_1$ and 1.5 $D_1$, more preferably comprised between 0.8 $D_1$ and 1.3 $D_1$, with $D_1$ being a nominal distance given by the following relation:

$$D_1 \simeq \frac{4L}{n_a \pi}$$

where L is the length of the channels 103.

With reference to FIG. 2*c*, a fourth embodiment of the present invention is shown, wherein the optical filter 100'" comprises the channels 103 in the form of cylindrical elements similar to those in the example shown in FIG. 1 and a second element of optically absorbing or reflecting material 109' made in the form of a cover of the entry surface 101 of the filter for the portion not comprising the portions overlapping the entry faces 104 of the channels 103. In particular, the second element of optically absorbing or reflecting material 109' is made and arranged so as to prevent the passage of light parallel to the channels and externally thereto through the interspaces between adjacent channels 103. In the embodiment of FIG. 2*c*, the optical filter 100'" is configured such that "the light rays crossing any channel 103 of the plurality of channels and belonging to a beam of rays emerging from any point on an edge of an entry face 104 of the channel exit the channel—specifically the exit face 105 of the channel—with substantially parallel directions". This property is verified according to the same conditions set out above with reference to the embodiment of FIG. 1.

According to other embodiments, the optical filter according to the present invention has a plurality of channels characterized by a distribution of channels having substantially non-circular sections. In the context of the present description and in the appended claims, the expression "distribution of substantially non-circular channels" is intended to mean a plurality of channels such that an average over the plurality of channels of the ratio among the radii of the circumferences circumscribed and inscribed to the section of each channel has a value greater than 1.05, preferably greater than 1.2, more preferably greater than 1.3. Preferably, the average of the ratio among the radii of the circumferences circumscribed and inscribed to the section of each channel has a value lower than 3, preferably lower than 2.5, more preferably lower than 2. An example of distribution of channels having substantially non-circular sections is a distribution of channels having a substantially elliptical section.

In the context of the present description and in the appended claims, the expression "inscribed circumferences" is intended to mean a plurality of inscribed circumferences, wherein each circumference is inscribed in the section of a respective channel. In the context of the present description and in the appended claims, the expression "circumscribed circumferences" is intended to mean a plurality of circumscribed circumferences, wherein each circumference circumscribes the section of a respective channel.

According to different embodiments, the optical filter comprises a plurality of channels with a polygonal section. Advantageously, channels with a polygonal section allow a greater covering or tessellation of the plane than in the case of channels with a circular section, and therefore a greater overall section of channels capable of collecting the incident light and a possible greater transmission efficiency. In fact, this conformation allows to optimise the occupation of the surfaces of the filter by the sections of the channels, reducing any possible interspaces to a minimum. Preferably, the optical filter may comprise a plurality of channels having a regular polygonal section, for example with a triangular, square or hexagonal section. An example of a channel with a hexagonal section 103 and relative optical filter 100,100', 100",100'" are shown respectively in FIGS. 3*a* and 3*b*.

According to other embodiments of the invention, the optical filter has a plurality of channels characterized by a distribution of channels having sections which are substantially not equal between them. In particular, in the context of the present description and in the appended claims, the expression "distribution of channels having sections that are not substantially equal" is intended to mean a plurality of channels such that each channel has a section having an effective radius of channel Re substantially different from the effective radius of channel Rc of at least another channel and/or has a shape substantially different from the shape of the section of at least another channel, where the effective radius of channel is defined as $$R_c \equiv \frac{\sqrt{A_c}}{\pi}$$

and where $A_c$ is the area of the section of the channel.

By way of non-limiting example, a first embodiment characterized by a distribution of channels having sections that are not substantially equal has a standard deviation of the distribution of the effective radii $R_c$ having a value comprised between 2% and 50%, preferably between 3% and 30%, more preferably between 4% and 20% of the value of the average radius R, where "average radius" is intended to mean the average of the channel effective radii $R \equiv \langle R_c \rangle$.

By way of further non-limiting example, in a different embodiment characterized by a distribution of channels having sections that are not substantially equal the optical filter comprises a plurality of channels such that the distribution of the radii of the circumferences inscribed in each section of each channel has a standard deviation greater than 2%, preferably 4%, more preferably 6% of the average value over the same distribution, the sections being in the plane orthogonal to the longitudinal axis. Preferably, the standard deviation is lower than 70%, preferably lower than 50%, more preferably lower than 30% of the average value.

According to other embodiments of the invention, the optical filter has a plurality of channels characterized by a distribution of averagely circular channels. In particular, in the context of the present description and in the appended claims, the expression "distribution of averagely circular channels" means a distribution of channels having substantially randomly oriented sections in a section plane. More particularly, the expression "distribution of averagely circular channels" is understood to mean a distribution such that: the locus of the points {x,y} in the section plane satisfying the relation $F(x,y)>CF_{max}$ is essentially a circle, i.e., it is a surface delimited by a perimeter where a maximum distance of the perimeter from a centre and a minimum distance of the perimeter from the centre differ from each other in an amount lower than 30%, preferably lower than 20%, more preferably lower than 10% of an average distance of the perimeter from the centre, where the average is carried out over the perimeter of the channel and where C=0.5, preferably C=0.3, more preferably C=0.2, and where F(x,y) is a function obtained:

- by translating without rotating in the section plane (x,y) all the sections of the channels so that they are aligned vertically, i.e. along the coordinate y, and horizontally, i.e. along the coordinate x, to a centre, and
- by attributing F(x,y) a value equal to the number of translated sections comprising the point (x,y).

By way of non-limiting example, in an embodiment characterized by a distribution of channels having averagely circular sections, the angular profile of luminous intensity $I(\theta, \phi)$ of the optical filter 100,100',100",100'" when illuminated by a diffused light (i.e., by a light with a substantially uniform luminance profile, i.e. independent of the position, and isotropic, i.e. substantially Lambertian), is substantially independent or weakly dependent on $\phi$, where $\theta$ is the polar angle with respect to the direction of the channels and $\phi$ is the azimuth angle. For example, the angular profile of luminous intensity $I(\theta, \phi)$ of the light produced by any portion of the optical filter 100,100',100",100'" when illuminated by a diffused light is substantially independent or weakly dependent on the azimuth angle $\phi$, where said portion circumscribes a circle having a radius equal to 15 cm, preferably at least equal to 10 cm more preferably at least equal to 5 cm.

Particularly, the angular profile of luminous intensity $I(\theta, \phi)$ of the optical filter 100,100',100",100'" illuminated by a diffused light is such that the region in the space of the angular coordinates $(\theta, \phi)$ outside of which $I(\theta, \phi)$ assumes a value lower than 50%, preferably lower than 70%, more preferably lower than 80% of the peak value is substantially a cone with a circular or elliptical base characterized by a minor axis of the ellipse having a length equal to at least 50%, preferably at least 60%, more preferably at least 70% of the major axis of the ellipse, or it is a cone wherein the difference between the maximum and minimum polar angles is lower than 30%, preferably lower than 20%, more preferably lower than 10% of the average polar angle, the average being carried out on the azimuth angles.

According to other embodiments of the invention, the optical filter has a plurality of channels characterized by a distribution of channels that are statistically equivalent to each other. In particular, in the context of the present description and in the appended claims, the expression "plurality of statistically equivalent channels" means that the probability that a channel has a certain characteristic, for example a section of a certain area, shape, or orientation in the section plane, is substantially the same for each channel of the plurality of channels, or that this distribution produces local average values, such as the average of the areas and/or of the shapes and/or of the orientation of the sections, which are substantially independent of the particular position in the section plane, the local average being understood to mean, for example, the average over a circular area with a radius equal to 15 cm, preferably equal to 10 cm, more preferably equal to 5 cm. By way of non-limiting example, an embodiment characterized by a distribution of channels that are statistically equivalent to each other has:

- a distribution of radii of the inscribed circumferences with standard deviation greater than 3%, preferably 5%, more preferably 7% of the average value on the optical filter 100,100',100",100'", and
- a distribution of a local average of the radii of the plurality of inscribed circumferences with standard deviation of less than 5%, preferably 3%, more preferably 1% of the average value over the entire optical filter, said local average being carried out over an area of the optical filter comprised in a circle of radius less than 15 cm, preferably less than 10 cm, more preferably less than 5 cm.

Preferred embodiments of the optical filter according to the present invention may comprise a plurality of channels characterized by a distribution of channels presenting a combination of the characteristics discussed above, and in particular a distribution of channels (i) that are substantially non-circular, and/or
(ii) having sections that are not substantially equal, and/or
(iii) averagely circular, and/or
(iv) statistically equivalent to each other.

Advantageously, a configuration of the filter which provides for a plurality of channels with substantially non-circular sections allows a better covering or tessellation than in the case of circular channels.

Advantageously, a configuration of the filter which provides for a plurality of channels having sections that are not substantially equal reduces the demand for high precision in the production phase, and thus production times and costs, and also favours a random arrangement and orientation of the sections of the channels, so as to allow the optical filter to produce an angular luminance profile that is substantially isotropic, i.e., independent of the azimuth coordinate, as required to produce an image of a circular sun.

Advantageously, a configuration of the filter which provides for a plurality of averagely circular channels further facilitates obtaining an optical filter capable of producing an angular luminance profile that is substantially independent of the azimuth coordinate.

Advantageously, a configuration of the filter that provides for a plurality of channels statistically equivalent to each other results in an invariance of the optical properties of the filter as perceived by an observer with respect to the specific position observed inside the filter, regardless of how much the properties of a single channel differ from those of another channel. Considering for example channels with average radius R<0.5 mm, R<0.2 mm, more preferably R<0.1 mm, characterized by a cut-off angle $\theta_0>1°$, more preferably $\theta_0>2°$, more preferably $\theta_0>4°$, the number of channels participating in the formation of the image of the sun in the observer at a typical distance from the filter, i.e. at a distance of more than a few tens of centimetres, is greater than several hundreds, thousands or tens of thousands of units, i.e. sufficient to produce a perception of the average luminance in the observer at any point of the optical filter 100,100',100'',100'''. In the context of the present description and in the appended claims with "cut-off angle" of the filter $\theta_0$ it is intended to indicate the average of the polar angle, measured with respect to the longitudinal axis, such that the angular luminance profile of the filter substantially cancels out (due to the presence of the first optically absorbing material interposed between adjacent channels), i.e. it assumes a value equal to 1/10, preferably 1/20, preferably equal to 1/30 of the peak value, e.g. in the case in which the filter is illuminated by a diffused light, i.e. by a light with a uniform and isotropic luminance profile, the average being evaluated with respect to the azimuth angle and over the whole surface of the filter. Alternatively, the cut-off angle of the filter $\theta_0$ is the average over the azimuth coordinate of the polar angle value so that the luminous intensity profile of the filter substantially cancels out when the filter is illuminated by a diffused light. In the context of the present description and in the following claims, the angle of $\theta_0$ coincides with the angle of the angular acceptance cone of the filter. In the context of the present description and in the appended claims, the cut-off angle of the filter $\theta_0$ is equivalently referred to as the acceptance angle $\theta_0$ or half-open angle of the acceptance cone $\theta_0$.

Figure 4A:
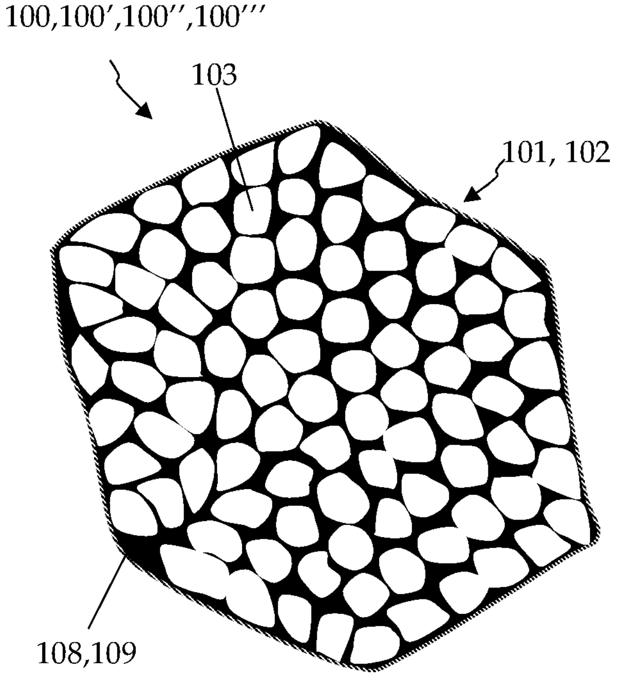
FIG. 4*a* is a schematic plan view of a surface of an optical filter according to another embodiment of the present invention.
Figure 4B:
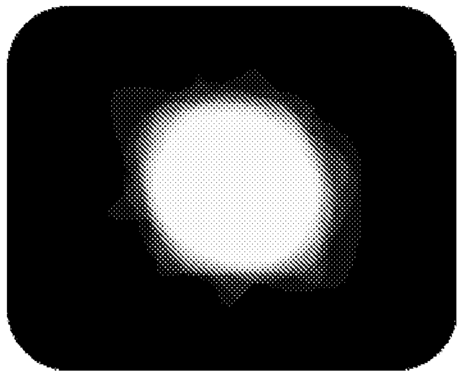
FIG. 4*b* shows an image obtained by illuminating the filter of FIG. 4*a* with a diffused light source.
Figure 4C:
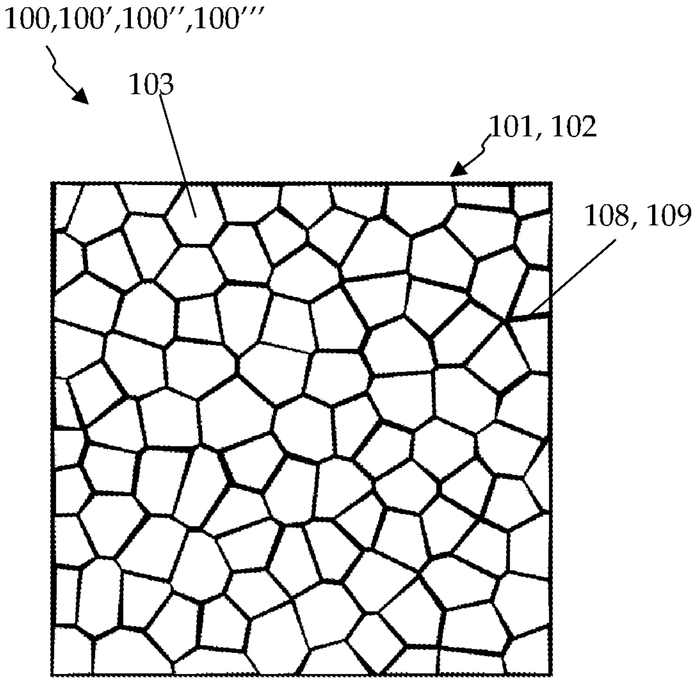
FIG. 4*c* shows a schematic plan view of a surface of an optical filter according to a different embodiment of the present invention.

According to different embodiments, the optical filter comprises a plurality of channels with a non-polygonal section, for example with a non-polygonal concave section or a non-polygonal convex section. An optical filter 100, 100',100'',100''' comprising a plurality of channels with a non-polygonal section is illustrated by way of non-exhaustive example in FIGS. 4*a*-4*b*. In the example shown in FIG. 4*a*, the filter has a plurality of channels 103 characterized by a distribution of substantially non-circular channels, having sections that are substantially not equal, averagely circular, and statistically equivalent between them.

Figure 4D:
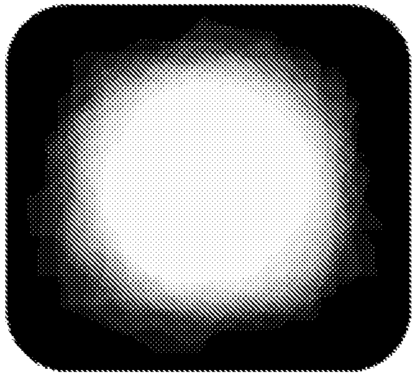
FIG. 4*d* shows an image obtained by illuminating the filter in FIG. 4*c* with a diffused light source.

According to further embodiments, the optical filter comprises a plurality of channels with a non-regular polygonal section, for example with a convex non-regular polygonal section. An optical 100,100',100'',100''' comprising a plurality of channels with a non-regular convex polygonal section is illustrated by way of non-exhaustive example in FIGS. 4*c*-4*d*. In the example shown in FIG. 4*c*, the filter has a plurality of channels characterized by a distribution of substantially non-circular channels, having sections that are substantially not equal, averagely circular, and statistically equivalent between them. Preferably, in the case of a plurality of channels with non-regular polygonal section, the channels 103 on average have bases having four or five or six or seven or eight sides. Even more preferably, an average of the number of sides of the base of each channel 103 is comprised between 4 and 8, and preferably is about 6.

Also in the case of the embodiments of FIGS. 4*a*-4*b* and 4*c*-4*d*, the channels 103 are arranged side by side and parallel to each other, so as to define a plurality of interspaces between adjacent channels. In addition, the interspaces are filled with an optically absorbing material 108, 109 which substantially reduces or prevents the passage of light both between adjacent channels and parallel to the channels and externally thereto.

Advantageously, the optical filter comprises a plurality of channels with a non-regular polygonal section, characterized by a distribution of channels having sections that are not substantially equal, averagely circular, and statistically equivalent between them, allows the maximum coverage section or tessellation of the plane, and thus maximum transmission efficiency, while at the same time allowing for the production of an angular profile of average luminance substantially independent of the azimuth coordinate, since the orientation of the polygons is substantially random.

With reference to the examples cited, and more generally to the optical filter according to the present invention, the particular configurations relative to the plurality of channels can be obtained, for example, by creating a block or melt by heating at temperatures close to the transition temperature of a bundle of optical fibers and then cutting a slice of said block or melt of the desired thickness along a plane that is suitably oriented with respect to the longitudinal axis of the fibers or channels. By way of non-limiting example, such blocking or melt may be obtained starting from

- a combination between a plurality of GRIN optical fibers and a plurality of elements of a first and/or a second optically absorbing material, or from
- a combination between a plurality of optical fibers GRIN covered with a layer or clad of a first optically absorbing material and a plurality of elements of a first and/or of a second optically absorbing material, or from
- a plurality of GRIN optical fibers covered with a layer or clad of a first optically absorbing material wherein, for example, said GRIN optical fibers covered with a layer or clad of a first material optically are in turn obtained by means of the drawing or extrusion technology of the optical fibers starting from a preform cylinder or prism having a core made of a transparent material and a coating or clad made of a first optically absorbing material and wherein the transparent core is in turn characterized by a refractive index profile whose value decreases starting from a maximum refractive index $n_a$ along a radially outward direction away from an axis of the preform cylinder or prism.

In particular, different distributions of the plurality of channels can be obtained by making the block or melt starting from different initial conditions, for example from different distributions of sections of the plurality of GRIN optical fibers and/or from different materials having different glass transition temperatures.

Hereinafter, "first surface" equivalently means the entry surface 101 and "second surface" equivalently means the exit surface 102 of the plurality of channels 103 of the optical filters 100, 100',100'',100'''.

Figure 5A:
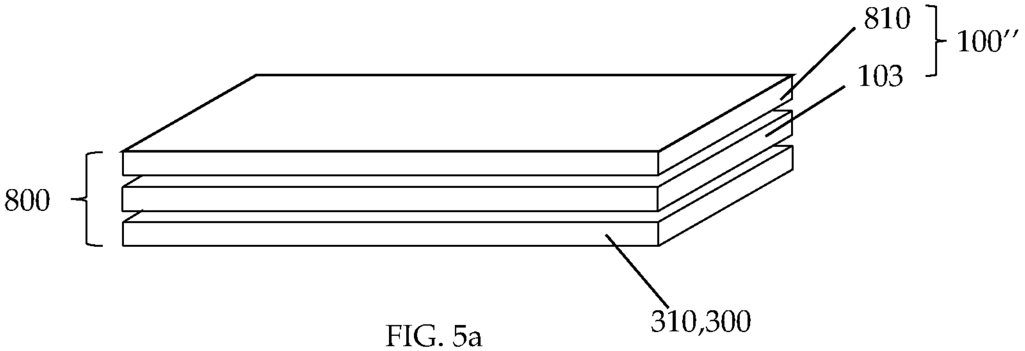
FIGS. 5*a* and 5*b* are a schematic representation of an exemplary embodiment of a light reflective unit and of a chromatic effect unit, respectively, employing an optical filter according to the present invention.
Figure 5B:
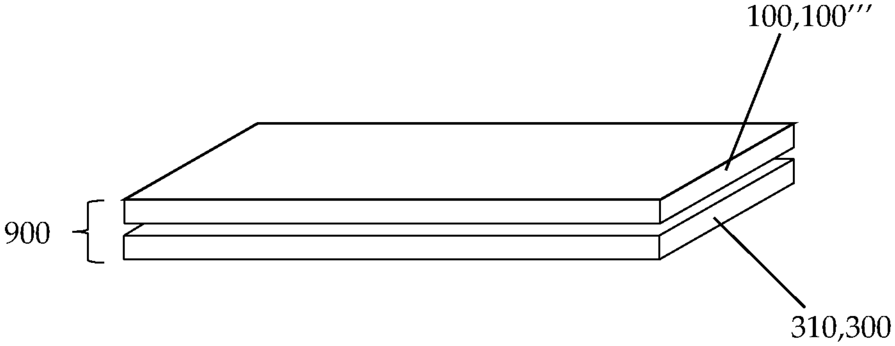

Referring to FIGS. 5*a* and 5*b* a first and second example of a chromatic effect unit 800,900 are illustrated which use respectively an optical filter 100'' and 100,100''' according to the present invention, respectively a light reflective unit 800 and a light transmission unit 900.

The chromatic effect light reflective unit 800 of FIG. 5*a* comprises an optical filter 100'' provided with a reflecting surface 810 positioned in an adjacent manner, preferably in contact, to the second substantially flat surface 102 of the plurality of channels 103, and a chromatic diffusion layer 310. In the illustrated embodiment, the chromatic diffusion layer 310 has a rear surface positioned in an adjacent manner, preferably in contact, to the second substantially flat surface 102 of the plurality of channels 103 and a front surface configured to be illuminated by incident light. Preferably, the chromatic diffusion layer 310 is a diffuser of the Rayleigh type, i.e., it is a light diffuser comprising a plurality of substantially transparent nanoelements dispersed in a substantially transparent host material. In particular, the nanoelements and the host material have different refractive indexes. Preferably the ratio of the greater to the lesser of the refractive indices of the nanoelements and the host material is greater than 1.02, preferably greater than 1.04, more preferably greater than 1.1, even more preferably greater than 1.5, even more preferably greater than 1.8. The chromatic diffusion layer 310 is configured such that the light reflective unit 800 produces a first direct light at polar angles lower than the cut-off angle $\theta_0$ of the light reflective unit 800, having on average a first CCT, and a second diffused light at polar angles greater than the cut-off angle $\theta_0$ of the light reflective unit 800, having on average a second CCT equal to at least 1.2 times, preferably at least 1.3 times, more at least preferably 1.5, even more preferably at least 1.8 times the first CCT, when the incident light is the standard illuminator CIE E, and wherein average means the average over the azimuth angles and over the polar angles that are respectively smaller and greater than $\theta_0$, as well as over the light reflective unit 800. The term cut-off angle $\theta_0$, or acceptance angle $\theta_0$ or half-opening angle of the acceptance cone, of the light reflective unit 800 is to be understood as the cut-off or acceptance angle associated with the path of the light crossing the optical filter 100", i.e. crossing the plurality of channels 103 in a double pitch, being reflected by the reflecting surface 810. With reference to the chromatic effect light reflective unit 800, with cut-off angle $\theta_0$, or acceptance angle $\theta_0$, it is to be understood the cut-off or acceptance angle of the light reflective unit 800 measured after having suitably removed the chromatic diffusion layer 310, or after having suitably subtracted from the angular profile of luminous intensity of the light reflected by the light reflective unit 800 the contribution due to the diffused light by the chromatic diffusion layer 310.

In the context of the present description and of the subsequent claims, for the quantification of CCT values, in general and for those indicated above, reference is made to an incident illumination coming from a white light source, for example a standard illuminator CIE E, which within the visible spectrum radiates equal energy and has a constant spectral power distribution (SPD). Although this is a theoretical reference, the standard illuminator CIE E is particularly suitable in the event of diffusion variability as a function of the wavelengths, as it has a uniform spectral weight with respect to all wavelengths.

Note that the chromatic diffusion properties are related to a relative refractive index between the nanoelements and the host material. Accordingly, the nanoelements may refer to solid particles, e.g., the spherical nanoparticles and/or nanoclusters and/or nanocylinders and/or nanoelements having at least one nanometric dimension, where by nanometric dimension it is meant a dimension preferably on average lower than 300 nm, more preferably lower at 250 nm, even more preferably lower than 150 nm, as well as to optically equivalent nanometric elements in liquid or gaseous phase, such as generally inclusions in liquid or gaseous phase (for example nanodrops, nanovoids, nanoinclusions, nanobubbles, nanochannels etc.) which have nanometric dimensions and are incorporated into the host materials. Exemplary materials comprising gas-phase inclusions (nanovoids/nanopores) in a solid matrix include aerogels that are commonly formed by three-dimensional metal oxides (e.g. silica, alumina, iron oxide) or by an organic polymer (e.g. polyacrylates, polystyrene, polyurethanes and epoxides) that host solid pores (air/gas inclusions) with dimensions on the nanometer scale. By way of example, materials comprising liquid-phase inclusions include nanometer-sized liquid crystal (LC) phases often referred to as liquid phase that includes nanodrops which are confined to a matrix which may commonly have a polymeric nature. The chromatic diffusion layer 310 is made, for example, in the form of a bulk panel, coating, varnish, coating film or the like.

The chromatic effect transmission unit 900 of FIG. 5*b* comprises a chromatic diffusion layer 310 in turn comprising a surface positioned in an adjacent manner, preferably in contact, to the first substantially flat surface 101 or to the second substantially flat surface 102 of the plurality of channels 103 of the optical filter 100,100''' and configured to be illuminated by incident light. Preferably, in line with the foregoing about the chromatic diffusion layer 310 of the light reflective unit, also with reference to the chromatic effect light transmission unit 900 said layer is a diffuser of the Rayleigh type, i.e. it is a light diffuser comprising a plurality of substantially transparent nanoelements dispersed in a substantially transparent matrix, wherein the nanoelements and the matrix have different refractive indexes. The chromatic diffusion layer 310 is configured such that the light transmission unit 900 produces a first direct light at polar angles lower than the cut-off angle $\theta_0$ having on average a first CCT and a second diffused light at polar angles greater than the cut-off angle $\theta_0$ having on average a second CCT equal to at least 1.2 times, preferably at least 1.3 times, more preferably at least 1.5, even more preferably at least 1.8 times the first CCT, when the incident light is the standard illuminator CIE E. Also in this case, the chromatic diffusion layer 310 is made, for example, in the form of a bulk panel, coating, varnish, coating film or the like.

In different embodiments not illustrated, instead of the chromatic diffusion layer 310 the light reflective unit 800 and/or the light transmission unit 900 comprise a diffused light generator 300 comprising a plurality of LED sources that are laterally coupled to a substantially planar and transparent light guide and configured to generate a diffused light having a CCT of a value equal to at least 1.2 times, preferably at least 1.3 times, more preferably at least 1.5 times, even more preferably at least 1.8 times the value of 5600 Kelvin.

According to a further aspect, the present invention provides a lighting unit or lighting device. In the context of this description and in the appended claims, the terms "lighting unit" and "lighting device" are to be regarded as equivalent.

Figure 6:
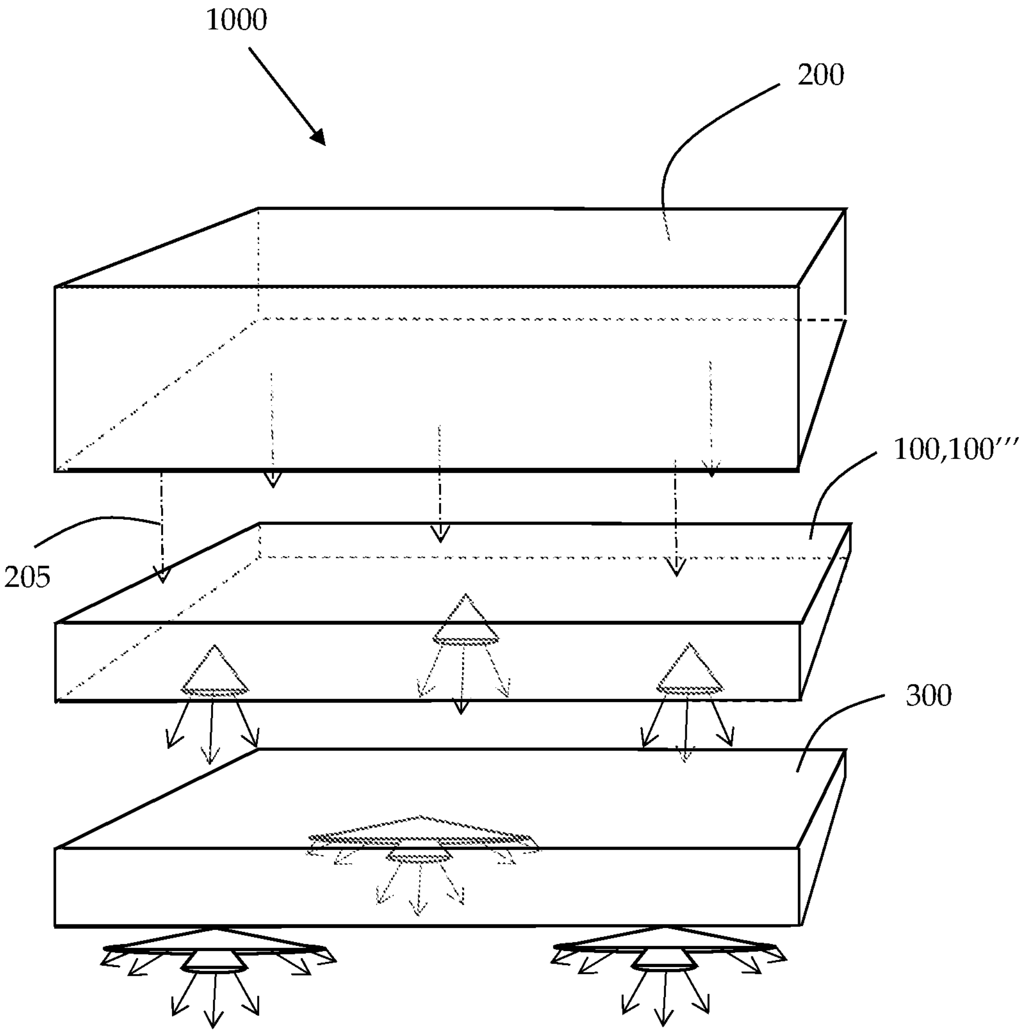
FIG. 6 is a schematic perspective view of a lighting device to reproduce the light of the sky and the sun according to the present invention.

Preferably, the lighting unit is an artificial light unit. With reference to FIG. 6 a first example of a lighting unit of artificial light 1000 to reproduce the light of the sun using an optical filter 100,100''' according to the present invention is illustrated. The lighting unit of artificial light 1000 comprises a direct light source 200 configured to emit visible light in a non-isotropic manner, preferably along directions in a neighbourhood of a main direction 205, having a first correlated colour temperature or CCT. In some embodiments according to the invention, the direct light source 200 is configured to emit visible light having a fixed CCT, for example a CCT higher than 5000 degrees Kelvin.

In other embodiments according to the invention, the direct light source 200 is configured to emit visible light having a variable CCT, for example a variable CCT in the range 1700-8000 degrees Kelvin.

An optical filter 100,100''' according to the invention is placed downstream of the direct light source 200 with respect to the main direction 205. Preferably, the optical filter is oriented with respect to the direct light source 200 so as to have the longitudinal axis Y-Y substantially parallel to the main direction 205. In the embodiment of FIG. 6 the optical filter 100,100''' is positioned so as to have the first surface 101 and/or the second surface 102 oriented perpendicular to the main direction 205. In other embodiments of the invention not illustrated, the optical filter 100,100''' is positioned so as to have the normal to the first surface 101 and/or to the second surface 102 inclined with respect to the main direction 205 by an inclination angle α (not illustrated) comprised between 5° and 80°, preferably between 10° and 70°, more preferably between 20° and 60°. In further embodiments of the invention, like for example shown in FIG. 6, the lighting unit of artificial light 1000 further comprises a diffused light source 300 positioned downstream of the optical filter 100,100''' with respect to the main direction 205. The diffused light source 300 is configured to transmit, at least partially, the filtered light exiting the filter 100,100'''. Specifically, the diffused light source is configured to produce a diffused light component and a transmitted light component with an angular luminance profile similar to the angular luminance profile of the filtered light, i.e. characterized by the presence of a cut-off angle with value close to $\theta_0$.

In some embodiments of the invention, the diffused light source 300 is configured to produce a light having a direct component having a correlated colour temperature or CCT lower than at least 20% of the correlated colour temperature or CCT of the light produced by the direct light source 200. For example, the diffused light source 300 is a Rayleigh diffuser. In other embodiments of the invention, the diffused light source 300 is configured to transmit and/or be at least partially transparent to a light having a direct component having a CCT substantially identical to the CCT of the light produced by the direct light source 200. For example, the diffused light source 300 is a side-lit diffuser panel, i.e. lit laterally by a source other than the direct light source.

In some embodiments of the invention, the diffused light source 300 is further configured to produce a diffused light component characterized by an angular luminance profile characterized by a divergence at least 2 times, preferably 3 times, more preferably 4 times greater than the divergence of the direct component, and/or by a correlated colour temperature or CCT at least 1.2 times, preferably at least 1.3 times, more preferably at least 1.5 times, even more preferably at least 1.8 times greater than the first CCT, and/or a CCT equal to 5600 Kelvin.

Figure 7:
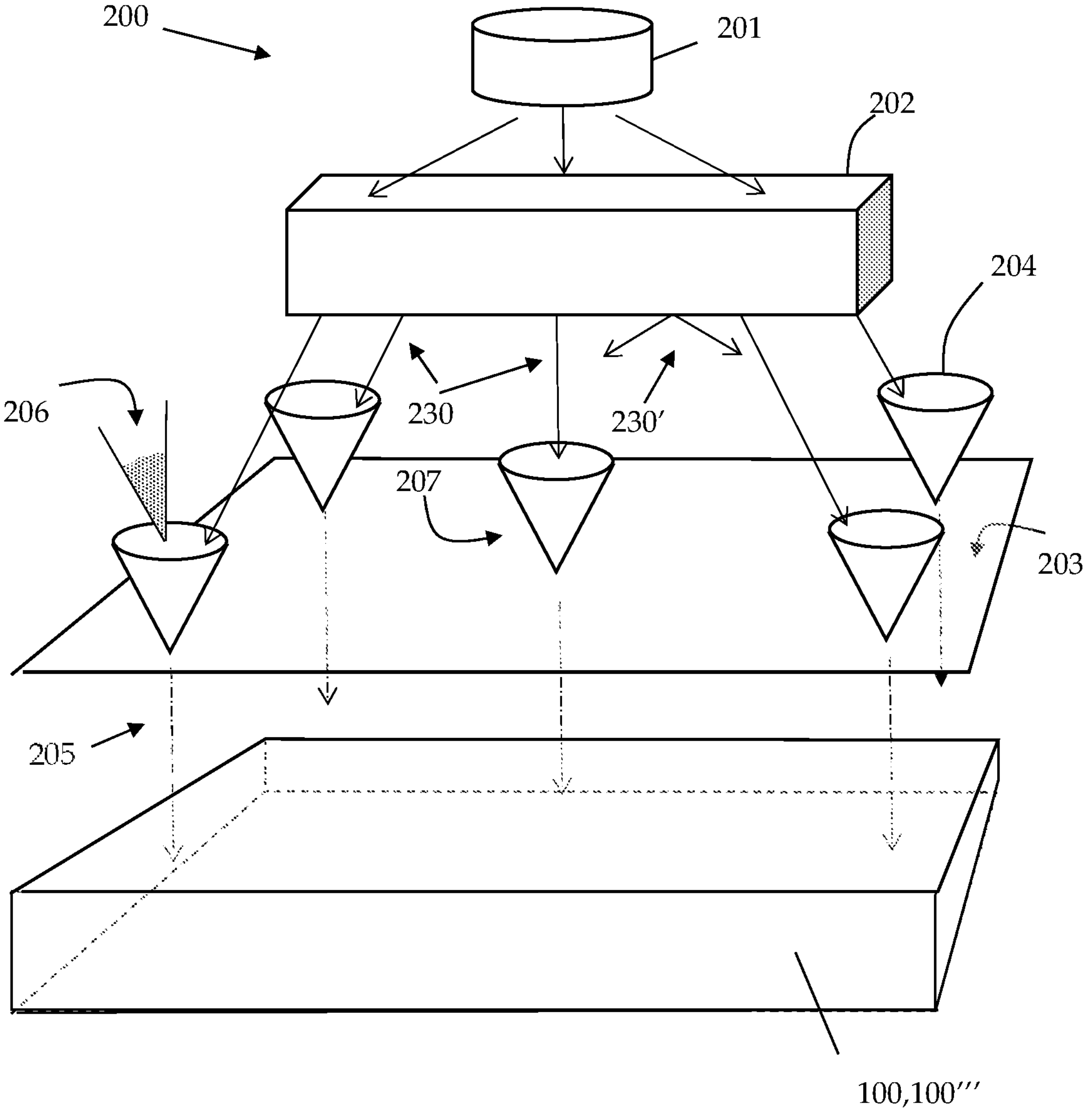
FIG. 7 is a schematic perspective view of a first variant of a light source used in the lighting device to reproduce the light of the sky and the sun according to the present invention.

In other embodiments of the invention, as for example shown in FIG. 7, the direct light source 200 comprises a visible light emitter 201, an optical system 202 for collimating the light emitted by the visible light emitter, and a flat surface of emission 203 of the direct light. The optical system 202 produces a light 230 which comprises a main component substantially collimated around a main direction 205 along directions preferably comprised within an emission cone 207 having a directrix along the main direction 205 and half-opening 206 of less than 50 degrees, preferably less at 30 degrees, more preferably less than 10 degrees.

In other embodiments of the invention, the emission cone 207 has half-opening of less than 20 degrees, preferably less than 15 degrees, more preferably less than 8 degrees.

In some embodiments of the invention, such as that shown by way of non-limiting example in FIG. 7, the light 230 produced by the optical system 202 also comprises a secondary or stray component 230', which propagates along directions external to the emission cone 207. In such embodiments, the light produced by the optical system 202 reaches a flat emission surface 203 from different directions, i.e. the luminance of the light 230 produced by the optical system 202 on the flat emission surface 203 is not spatially uniform having an angular profile characterized by a peak for a direction varying across the surface, for example varying as one moves away from the main direction 205 the more one moves away from the centre. In other embodiments not illustrated, the luminance of the light 230 produced by the optical system 202 on the flat emission surface 203 has a peak for a direction that varies in a non-monotonic manner, for example periodically, across an emission surface.

In some embodiments of the invention, the optical system 202 is further configured such that the main component of the light 230 produced by it generates a substantially uniform illuminance on a surface, for example, referring to FIG. 7, it generates a substantially uniform illuminance on the flat emission surface 203.

Figure 8:
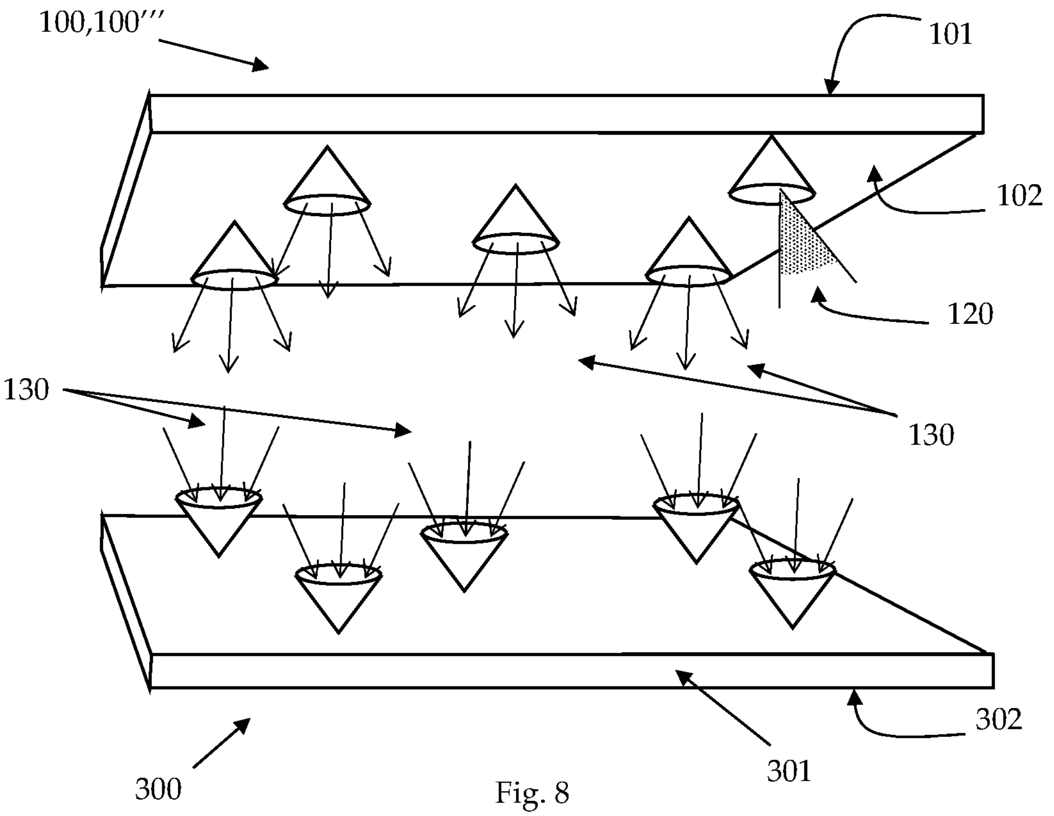
FIGS. 8 and 9 are schematic representations of the light entering and exiting the components of the lighting device to reproduce the light of the sky and the sun according to the present invention.

In some embodiments of the invention, as shown by way of non-limiting example in FIG. 8, the optical filter 100, 100''' is preferably sized in order to produce an acceptance cone with half-opening 120 substantially coincident or greater, for example 1.5, 2 or 3 times greater, than the half-opening 206 of the emission cone 207 which characterizes the light 230 emitted by the visible light emitter 201 and collimated by the optical system 202, this half-opening 120 of the acceptance cone being equal to the cut-off angle $\theta_0$ of the filter 100,100'''. In the context of the present description and in the appended claims, the expression "angular acceptance cone" is intended to indicate the set of directions which form an angle with respect to the longitudinal axis that is lower than or equal to the cut-off angle $\theta_0$.

Figure 9:
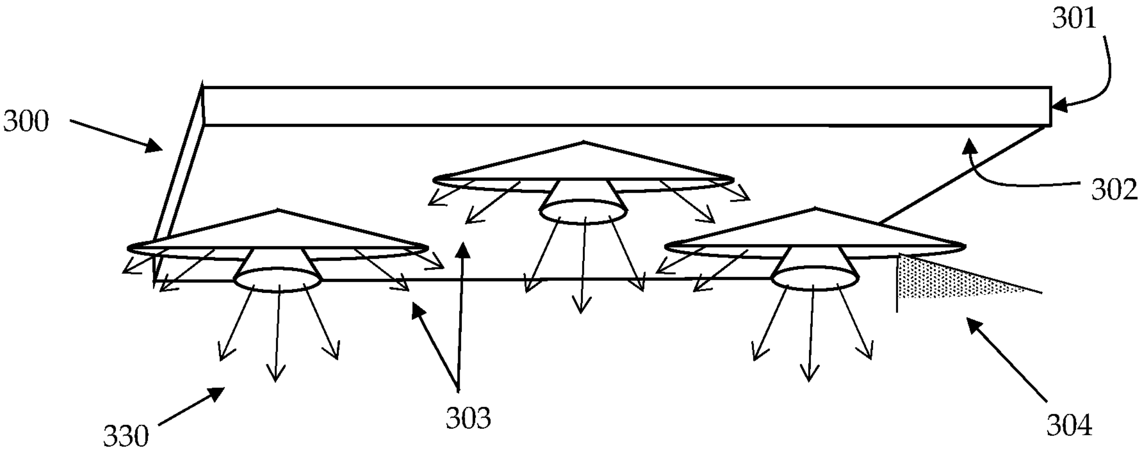

In some embodiments of the invention, as shown by way of non-limiting example in FIG. 9, the diffused light source comprises a Rayleigh diffuser panel 300—as for example described in the International Patent Application No. WO 2009/156348 of the same Applicant. The Rayleigh diffuser panel preferably comprises a dispersion of nanoparticles in a polymer matrix, wherein the diameter of the nanoparticles, the number of nanoparticles per unit area, the refractive index of the nanoparticles and of the matrix in which they are dispersed are such as to enable the Rayleigh diffuser panel to produce, on an emission surface 302, a diffused light 303 characterized by a correlated colour temperature or CCT equal to at least 1.2 times, preferably at least 1.3 times, more preferably at least 1.5 times greater than the first CCT, by a luminance profile with an angular half-opening of diffused light 304 of at least 60°, preferably of at least 70°, and an overall luminous flux equal to at least 10% of the total luminous flux of the filtered light 130 impinging on the Rayleigh diffuser panel 301.

Figure 10:
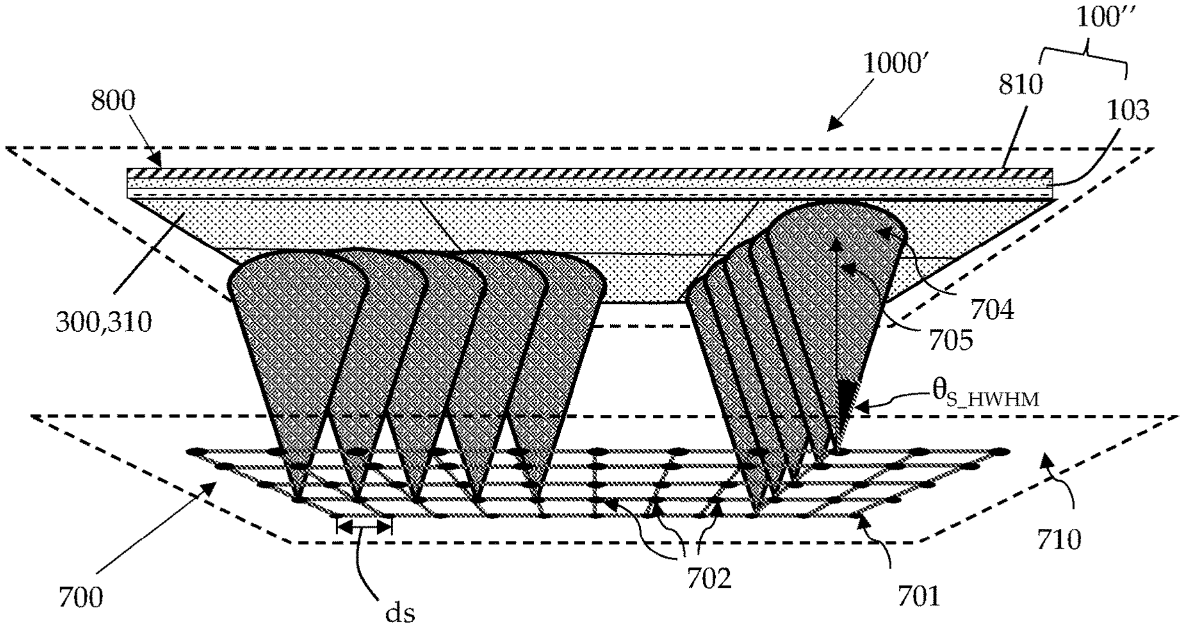
FIG. 10 is a schematic representation of a further lighting unit of artificial light to reproduce the light of the sun in accordance with the present invention.

A different example of a lighting unit of artificial light 1000' to reproduce the light of the sun using an optical filter 100'' according to the present invention, shown by way of example in FIG. 10, comprises a direct light source 700, which verifies all the properties of the direct light source 200 already mentioned with reference to FIGS. 6-9, and in particular it comprises a plurality of light sources 702 arranged on a substantially transparent surface 710, oriented so as to direct the light from one side of the surface 710, these sources 702 being separated from each other by a minimum source distance ds. Preferably, the sources 702 are arranged equidistantly. Specifically, the transparent surface 710 is configured such that an observer can see through it a large portion of the scene behind it, i.e., he can see at least 50%, preferably at least 60%, more preferably at least 70% of the scene behind it, wherein the percentages are evaluated in terms of the solid angle subtending the scene or solid angle of view.

Each light source 702 of the plurality of light sources is arranged and configured to generate a beam of light 704 with an angular source luminance profile having a peak along a main direction 705 and an angular half-width at half height of the peak θs_HWHM, where the main direction 705 and the angular half-width of source θs_HWHM are common to all the light sources of the plurality of light sources 702, and the main direction 705 is inclined with respect to the normal to the support plane by an angle comprised between 0° and 80°, preferably between 0° and 70°, more preferably between 0° and 60°.

The lighting unit of artificial light 1000' also comprises a chromatic effect light reflective unit 800 which integrates the optical filter 100" according to the present invention. The chromatic effect light reflective unit 800 is substantially planar and with normal substantially parallel to the main direction 705. In particular, the chromatic effect light reflective unit 800 is positioned in the space such that the light sources of the plurality of light sources 702 illuminate it substantially uniformly. For this purpose, for example, a minimum distance Dmin between each light source 702 and the chromatic effect light reflective unit 800 measured along the main direction 705 fulfils the relation: Dmin>0.5 ds tan(θs_HWHM), preferably Dmin>ds tan(θs_HWHM), more preferably Dmin>2 ds tan(θs_HWHM).

The chromatic effect light reflective unit 800 comprises at least:

- an optical filter 100" provided with a reflecting surface 810 oriented towards the direct light source 700 and with a plurality of channels 103 arranged in a position adjacent to the reflecting surface 810, preferably in contact with the same 810; and
- a diffused light source 300 interposed between the optical filter 100" and the direct light source 700, in particular placed adjacent to the optical filter 100". In particular, the diffused light source 300 is preferably made according to what was previously described with reference to the embodiment of FIG. 6-9.

The optical filter 100" is preferably sized such that the assembly consisting of the reflecting surface 810 and the plurality of channels 103 produces an angular acceptance cone with half-opening 120 substantially coincident with or greater than, for example 1.5, 2 or 3 times greater than, a half-opening θs_HWHM of the emission cone 704 characterizing the light emitted by each of the light sources 702.

Advantageously, the lighting unit of artificial light 1000' thus configured allows an observer positioned in such a way that the direct light source 700 is interposed between the observer and the chromatic effect light reflective unit 800 and observing said unit through the substantially transparent surface 710 of the light source 700 to perceive, beyond this transparent surface 710, a uniform sky and a circular sun placed at infinite distance—in other words, a sun whose image follows the movement of the observer, for example, moving with the same distance or moving at the same speed if the observer moves in a plane perpendicular to the main direction 705. This effect takes place irrespective of whether the direct light source 700 is realized through a plurality of light sources 702 distributed on the transparent surface 710.

As a further advantage, the lighting unit of artificial light 1000' thus configured produces the image of a round sun in sharp contrast to the sky even under conditions of a very bright outdoor environment because the light reflected from the reflecting surface at angles greater than the cut-off angle $\theta_0$ of the optical filter 100" is intercepted and substantially removed by this filter 100".

In the embodiment of FIG. 10, the direct light source comprises, by way of non-limiting example, a support grid 701 which defines the transparent surface 710 and which supports the plurality of light sources 702. In particular, the grid 701 of FIG. 10 has a square pitch, but in a completely equivalent way it is possible to make a grid with a triangular, hexagonal or other regular pitch. In the embodiment of FIG. 10, the light sources 702 are arranged on the support grid 701 in a manner substantially equidistant from each other at the source distance ds. In particular, the light sources 702 are arranged on the vertices of the grid 701.

Figure 11:
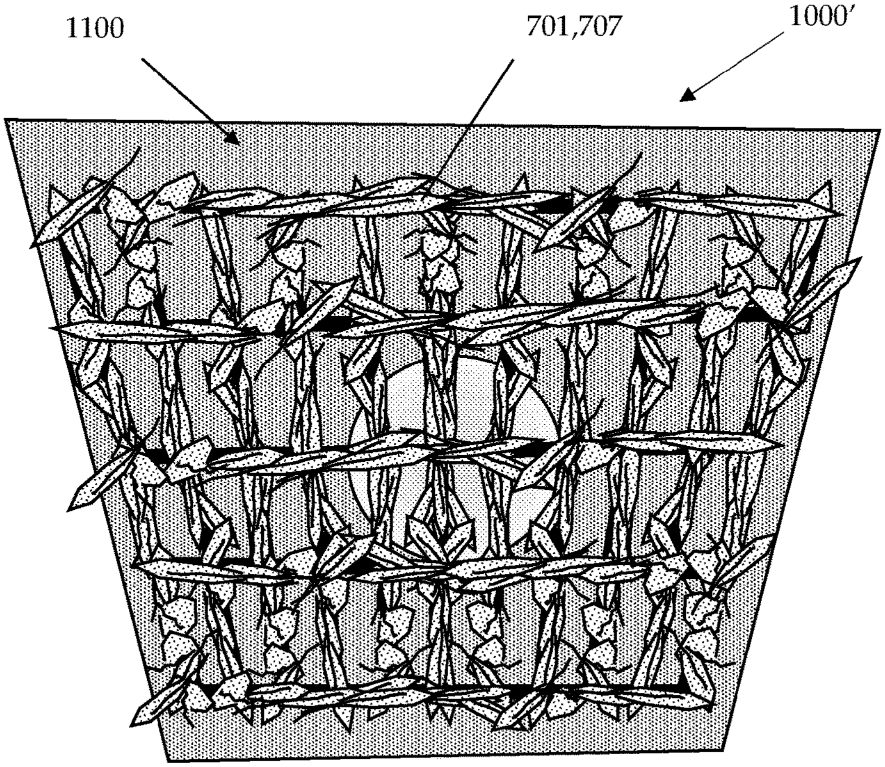
FIG. 11 is a schematic representation of another lighting unit of artificial light to reproduce the light of the sun in accordance with the present invention.

A second exemplary and non-limiting embodiment of the lighting unit of artificial light 1000' is illustrated in FIG. 11. The lighting unit of artificial light 1000' of FIG. 11 includes in addition to what has been described with reference to FIG. 10, a masking structure 707 positioned and configured so as to prevent the view of the light sources 702 from the observer of the chromatic effect light reflective unit 800 through the support grid 701. In particular, the masking structure 707 is a pergola comprising a distribution 708 of live or artificial plants.

Figure 12A:
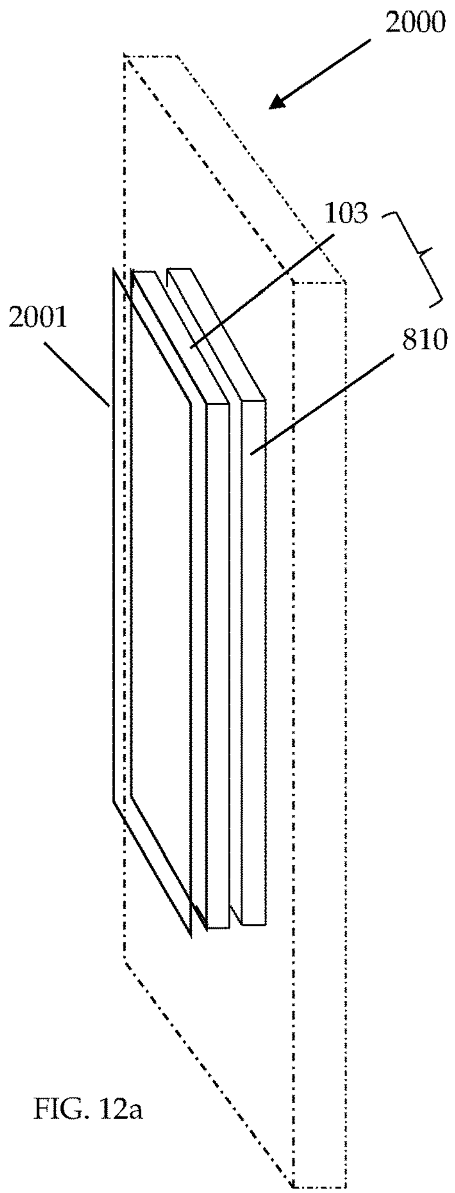
FIGS. 12*a*, 12*b* and 12*c* are schematic representations of different embodiments of lighting units of natural light using the optical filter according to the present invention.
Figure 12C:
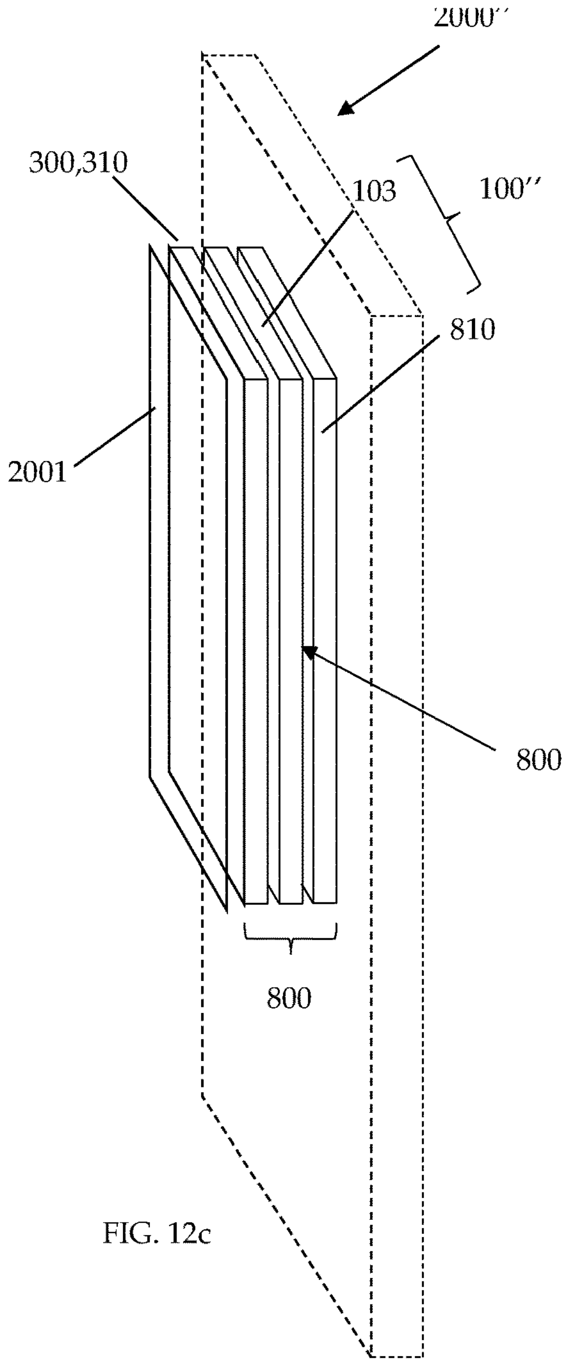
Figure 12B:
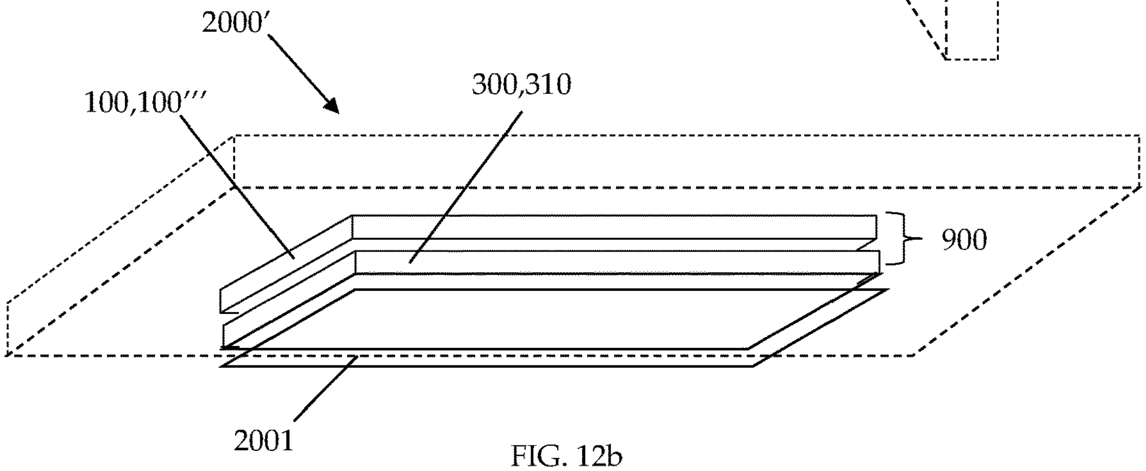

According to a different aspect of the present invention, the lighting unit is a lighting unit of natural light 2000, 2000',2000" that is a lighting unit configured to produce a light originating from a natural light and/or obtained by processing a natural light. Exemplary embodiments of lighting units of natural light 2000, 2000', 2000" according to the present invention are illustrated in FIGS. 12*a*-12*c*.

In the context of the present invention, the term "natural light" means a light originally produced by the sun. By way of non-limiting example, natural light is, for example, the direct light of the sun and/or the light of the sun transmitted and/or reflected and/or diffused and/or refracted and/or diffracted by a natural and/or artificial element, such as the light of the sun diffused by clouds, or by fog or haze or by the sky or by the moon or by a wall.

Preferably, the lighting unit of natural light 2000, 2000', 2000" comprises a receiving surface 2001 configured to receive a natural light and an optical filter 100, 100',100", 100'" according to the present invention, this optical filter having the entry surface 101 and/or the exit surface 102 at least partially overlapping the receiving surface 2001.

Preferably, the lighting unit of natural light 2000', 2000" comprises a diffused light source 300 configured to emit a diffused visible light 2101 having a correlated colour temperature or CCT at least 1.2 times, preferably at least 1.3 times, more preferably at least 1.5 times, even more preferably at least 1.8 times greater than a CCT of the natural light and/or a CCT equal to 5600 Kelvin.

Preferably, the lighting unit of natural light 2000,2000', 2000" comprises a receiving surface 2001 configured to receive a natural light and a chromatic effect light reflective 800 and/or light transmission 900 unit according to the present invention.

In an alternative embodiment illustrated in FIG. 12*a*, the lighting unit of natural light 2000 comprises an optical filter 100" provided with a reflecting surface 810 and is configured as a wall panel and/or as a ceiling panel.

In a different embodiment illustrated in FIG. 12*b*, the lighting unit of natural light 2000' comprises a chromatic effect light transmission unit 900 and is configured as a skylight or a window.

In a further embodiment illustrated in FIG. 12*c*, the lighting unit of natural light 2000" comprises a chromatic effect light reflective unit 800 and is configured as a wall panel and/or as a ceiling panel and/or as an element of a building façade.

Advantageously, the lighting unit of natural light 2000 comprising an optical filter 100" provided with a reflecting surface 810 which produces an infinity image of a circular sun with well-defined contours. For example, this occurs when it is illuminated by direct light of the sun striking the optical filter 100" from a direction belonging to the acceptance cone of the optical filter 100", or when it is illuminated by diffused natural light, contributing to the creation of a perception of infinite space. Advantageously, in the presence of direct light of the sun, it is possible to significantly reduce the glare effect of the sun, which effectively prevents the observer from seeing the sun directly, without compromising the view to infinity. For this purpose it is sufficient to size the cut-off angle 80 so that the reflected image of the sun is perceived under a solid angle much greater than the solid angle which subtends the image of the sun, corresponding to a flat angle at the vertex of the cone that subtends the image equal to 0.5°. For example, for $\theta_0=10°$, the luminance of the reflected sun is attenuated by at least 1600 times with respect to that of the natural sun, without substantially compromising contrast (as is the case with conventional diffusive reflecting surfaces).

Advantageously, the lighting unit of natural light 2000' comprising a chromatic effect light transmission unit 900 and, for example, a chromatic diffusion layer 310 of the Rayleigh type, produces an infinity image of a sun in sharp contrast to a cloudless sky. This happens, for example, when it is illuminated by diffused white light. For example, if used as a skylight or window, it is illuminated and produces the effect of a clear day with the sun in the sky when outside the sky is instead grey and overcast, cutting off light in most of the directions of origin of the direct light of the sun when outside the day is sunny.

Advantageously, the lighting unit of natural light 2000" comprising a chromatic effect light reflective unit 800 and, for example, a chromatic diffusion layer 310 of the Rayleigh type, produces an infinity image of a sun in sharp contrast to a cloudless sky. This happens, for example, when it is illuminated by diffused white light, similarly to the case of the lighting unit of natural light 2000' provided with a chromatic effect light transmission unit 900. For example, when used as an element of a building façade, it can be configured to generate the image of a blue and clear sky and of a warmer coloured sun standing out sharply on the horizon in contrast to the sky when the day is completely grey and the sky overcast. Advantageously, in the presence instead of direct lighting from the sun, i.e. on a clear day, the lighting unit of natural light 2000" provided with a chromatic light effect reflective unit 800 diffuses in all directions a light having a CCT greater than the CCT of the light of the sun, e.g. a light having a CCT 2, or 3 or 4 times greater than the CCT of the light of the sun, thus recreating a light surface similar to the sky, e.g. by recreating it on the illuminated façade.

The invention claimed is:

1. An optical filter comprising
a substantially flat entry surface,
a substantially flat exit surface parallel to the entry surface,
a plurality of channels made of a material substantially transparent to light, wherein the channels of the plurality of channels
comprise an entry face, an exit face and a lateral surface extending perimetrically between the entry face and the exit face over a length (L) of the channels,
are arranged side by side and parallel to each other, so as to define a plurality of interspaces between adjacent channels,
have a channel axis (Y) incident to the entry and exit surface, and
are arranged with the entry face substantially overlapping the entry surface and with the exit face substantially overlapping the exit surface,
at least one optical material configured and arranged with respect to the channels so as to reduce and/or substantially prevent the passage of light between adjacent channels of the plurality of channels and so as to reduce and/or substantially prevent the passage of light parallel to and externally to the channels;
wherein the channels have a refractive index whose value decreases starting from a maximum refractive index ($n_a$) along a radially outward direction away from the channel axis (Y) passing through a centre of gravity of a section of the respective channel, so as to define a radial profile of refractive index of the channels,
wherein the radial profile of refractive index of the channels is configured such that the light rays crossing any channel of the plurality of channels and belonging to a beam of rays emerging from any point on an edge of an entry face of the channel exit the channel with substantially parallel directions; and
wherein the optical material comprises
a first element configured and arranged with respect to the channels so as to reduce and/or substantially prevent the passage of light between adjacent channels of the plurality of channels, and
a second element configured and arranged with respect to the channels so as to reduce and/or substantially prevent the passage of light parallel to the channels and externally thereto through the interspaces between adjacent channels.

2. The optical filter according to claim 1, wherein the radial profile of refractive index of the channels is configured such that the light rays crossing any channel of the plurality of channels and belonging to a beam of rays emerging from any point on an edge of an entry face of the channel exit the exit face from the channel with substantially parallel directions.

3. The optical filter according to claim 1, wherein the radial profile of refractive index of the channels is configured such that, when the exit surface is placed side-by-side to a reflecting surface, the light rays crossing any channel of the plurality of channels and belonging to a beam of rays emerging from any point on an edge of an entry face of the channel exit the entry face from the channel with substantially parallel directions.

4. The optical filter according to claim 1, wherein the channel axis (Y) is orthogonal to the entry surface and to the exit surface, and wherein the filter comprises a reflecting surface positioned in an adjacent manner to the exit surface, wherein the radial profile of refractive index of the channels is configured such that the light rays crossing any channel of the plurality of channels and belonging to a beam of rays emerging from any point on an edge of an entry face of the channel exit the entry face with substantially parallel directions.

5. A light reflective unit comprising:

an optical filter according to claim 4; and a chromatic diffusion layer comprising a rear surface positioned in an adjacent manner to the exit surface and a front surface configured to be illuminated by incident light, wherein the chromatic diffusion layer comprises a plurality of substantially transparent nanoelements dispersed in a substantially transparent matrix, the nanoelements and the matrix having different refractive indexes, and is configured such that the light reflective unit produces a first direct light at a first correlated color temperature (CCT) at polar angles lower than the cut-off angle ($\theta_0$) and a second diffused light at a second CCT at polar angles greater than the cut-off angle ($\theta_0$), with the second CCT equal to at least 1.2 times, at least 1.3 times, or at least 1.5 times the first CCT, when the incident light is white light.

6. The optical filter according to claim 1, wherein each channel has one or more of a regular polygonal section, a substantially elliptical section, a non-polygonal concave or convex section, an irregular polygonal section, and a convex irregular polygonal section.

7. The optical filter according to claim 1, wherein the channels of the plurality of channels are cylindrical elements having substantially identical conformation between them and having a substantially circular section with a diameter of the cylindrical elements.

8. The optical filter according to claim 7, wherein the channels of the plurality of channels have a channel axis (Y) perpendicular to the entry surface and to the exit surface.

9. The optical filter according to claim 1, wherein a first element of the optical material comprises a cylindrical jacket substantially covering the lateral surface of the cylindrical elements, wherein the cylindrical jacket has a thickness significantly lower than the diameter of the cylindrical elements, and comprises a layer of rigid material selected from the group comprising glass, quartz, PMMA, polycarbonate, or other polymer resin.

10. The optical filter according to claim 9, wherein the layer of rigid material is covered on an outer lateral surface thereof by a second element of the optical material.

11. The optical filter according to claim 10, wherein the second element is in the form of a varnish, a film, or a sheath made of an optically absorbing material, and the layer of rigid material is made of an optically absorbing material.

12. The optical filter according to claim 1, wherein a first element of the optical material comprises a jacket substantially covering the lateral surface of the channels and comprises a layer of rigid material.

13. The optical filter according to claim 12, wherein the rigid material is selected from the group comprising glass, quartz, PMMA, polycarbonate, or other polymer resin.

14. The optical filter according to claim 1, wherein the second element of the optical material coincides with the first element of the optical material.

15. The optical filter according to claim 1, wherein the plurality of channels:

comprises a plurality of statistically equivalent channels.

16. A lighting unit of artificial light to reproduce the light of the sun, the lighting unit comprising:

a direct light source configured to emit visible light in a non-isotropic manner; and an optical filter according to claim 1, positioned downstream of the direct light source so that the entry surface of the optical filter is illuminated by the light emitted by the direct light source.

17. The optical filter according to claim 1, wherein said optical filter has an image plane and an object plane, the object plane being placed at a distance (D) from the entry surface and/or the image plane being placed at a distance from the exit surface, the distance (D) being measured along the direction of the channel axis (Y) and being between 0.5 $D_1$ and $2D_1$, between $0.7D_1$ and $1.5D_1$, or between $0.8D_1$ and $1.3D_1$, with $D_1$ being a nominal distance given by the relation:

$$D_1 \simeq \frac{2L}{n_a \pi}.$$

18. The optical filter according to claim 1, wherein said optical filter has an image plane and an object plane, the object plane being placed at a distance (D) from the entry surface and/or the image plane being placed at a distance (D) from the exit surface, the distance (D) being measured along the direction of the channel axis (Y) and being between $0.5D_1$ and $2D_1$, between $0.7D_1$ and $1.5D_1$, or between $0.8D_1$ and $1.3D_1$, with $D_1$ being a nominal distance given by the relation:

$$D_1 \simeq \frac{2.41L}{n_a}.$$

19. The optical filter according to claim 1, wherein said optical filter has an image plane and an object plane, the object plane being placed at a distance (D) from the entry surface and/or the image plane being placed at a distance (D) from the exit surface, the distance (D) being measured along the direction of the channel axis (Y) and being between $0.5D_1$ and $2D_1$, between $0.7D_1$ and $1.5D_1$, or between $0.8D_1$ and $1.3D_1$, with $D_1$ being a nominal distance given by the relation:

$$D_1 \simeq \frac{4L}{n_a \pi}.$$

20. The optical filter according to claim 1, wherein cross-sectional surfaces of the channels are substantially randomly oriented with respect to a cross-sectional plane.

21. The optical filter according to claim 1, wherein the plurality of channels have a distribution of effective radii of channel Rc that has a standard deviation value between 2% and 50% of a value of an average channel radius R.

22. An optical filter comprising a substantially flat entry surface, a substantially flat exit surface parallel to the entry surface, a plurality of channels made of a material substantially transparent to light, wherein the channels of the plurality of channels comprise an entry face, an exit face and a lateral surface extending perimetrically between the entry face and the exit face over a length (L) of the channels, are arranged side by side and parallel to each other, so as to define a plurality of interspaces between adjacent channels, have a channel axis (Y) incident to the entry and exit surface, and are arranged with the entry face substantially overlapping the entry surface and with the exit face substantially overlapping the exit surface, at least one optical material configured and arranged with respect to the channels so as to reduce and/or substantially prevent the passage of light between adjacent channels of the plurality of channels and so as to reduce and/or substantially prevent the passage of light parallel to and externally to the channels;

wherein the channels have a refractive index whose value decreases starting from a maximum refractive index (n a) along a radially outward direction away from the channel axis (Y) passing through a centre of gravity of a section of the respective channel, so as to define a radial profile of refractive index of the channels, wherein the radial profile of refractive index of the channels is configured such that the light rays crossing any channel of the plurality of channels and belonging to a beam of rays emerging from any point on an edge of an entry face of the channel exit the channel with substantially parallel directions, wherein a first element of the optical material comprises a sheath or a film or a varnish or a layer of rigid material made with a first optically absorbing material substantially covering the lateral surface of the channels, wherein the first element of the optical material a refractive index that depends on the distance from the channel axis (Y), and wherein a second element of the optical material comprises an element of absorbing or reflective material covering and/or constituting at least a portion of the entry surface and/or of the exit surface not comprising the portions overlapping the entry and exit faces of the channels.

23. The optical filter according to claim 22, wherein a second element of the optical material comprises an element that at least partially fills the plurality of defined interspaces between adjacent channels.

24. The optical filter according to claim 22, wherein the absorption coefficient of the first element of the optical material guarantees an absorption of at least 10%, at least 25%, or at least 40% of the visible light for a material thickness equal to ⅕ of a diameter of the entry face or of the exit face of the channels.

25. A transmission unit comprising:

an optical filter comprising a substantially flat entry surface, a substantially flat exit surface parallel to the entry surface, a plurality of channels made of a material substantially transparent to light, wherein the channels of the plurality of channels comprise an entry face, an exit face and a lateral surface extending perimetrically between the entry face and the exit face over a length (L) of the channels, are arranged side by side and parallel to each other, so as to define a plurality of interspaces between adjacent channels, have a channel axis (Y) incident to the entry and exit surface, and are arranged with the entry face substantially overlapping the entry surface and with the exit face substantially overlapping the exit surface, and at least one optical material configured and arranged with respect to the channels so as to reduce and/or substantially prevent the passage of light between adjacent channels of the plurality of channels and so as to reduce and/or substantially prevent the passage of light parallel to and externally to the channels; and a chromatic diffusion layer comprising a surface positioned adjacent to the entry surface or to the exit surface of the optical filter and configured to be illuminated by incident light, wherein the channels have a refractive index whose value decreases starting from a maximum refractive index ($n_a$) along a radially outward direction away from the channel axis (Y) passing through a centre of gravity of a section of the respective channel, so as to define a radial profile of refractive index of the channels, wherein the radial profile of refractive index of the channels is configured such that the light rays crossing any channel of the plurality of channels and belonging to a beam of rays emerging from any point on an edge of an entry face of the channel exit the channel with substantially parallel directions; and wherein the chromatic diffusion layer comprises a plurality of substantially transparent nanoelements dispersed in a substantially transparent matrix, the nanoelements and the matrix having different refractive indexes, and is configured such that the chromatic effect unit produces a first direct light at a first correlated color temperature (CCT) at polar angles lower than the cut-off angle ($\theta_0$) and a second diffused light at a second CCT at polar angles greater than the cut-off angle ($\theta_0$), with the second CCT equal to at least 1.2 times, at least 1.3 times, or at least 1.5 times the first CCT, when the incident light is white light.

* * * * *